US010282475B2

(12) United States Patent
Patten et al.

(10) Patent No.: US 10,282,475 B2
(45) Date of Patent: May 7, 2019

(54) GENERATION OF BROWSER SUGGESTIONS BASED ON INTERNET OF THINGS DEVICE DATA

(71) Applicant: Microsoft Technology Licensing, LLC, Redmond, WA (US)

(72) Inventors: Michael J. Patten, Sammamish, WA (US); Ritika Kapadia, New Castle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 617 days.

(21) Appl. No.: 14/574,805

(22) Filed: Dec. 18, 2014

(65) Prior Publication Data

US 2016/0179962 A1   Jun. 23, 2016

(51) Int. Cl.
*G06F 17/30* (2006.01)
*G06F 11/30* (2006.01)
(Continued)

(52) U.S. Cl.
CPC .... *G06F 17/30867* (2013.01); *G06F 11/3013* (2013.01); *G06F 17/3053* (2013.01);
(Continued)

(58) Field of Classification Search
CPC .......... G06F 17/30867; G06F 17/3053; G06F 11/3013; G06Q 30/00; H04L 47/70; H04L 67/12
See application file for complete search history.

(56) References Cited

U.S. PATENT DOCUMENTS

2009/0171930 A1*   7/2009   Vaughan ........... G06F 17/30876
2014/0047322 A1    2/2014   Kim et al.
(Continued)

FOREIGN PATENT DOCUMENTS

CN   102012146 A   4/2011
CN   102053960 A   5/2011
(Continued)

OTHER PUBLICATIONS

Dominique Guinard et al; "From the Internet of Things to the Web of Things: Resource-oriented Architecture and best practices", Apr. 12, 2011(Apr. 12, 2011), pp. 97-129, ISBN: 978-3-642-19157-2.*
(Continued)

*Primary Examiner* — Mark D Featherstone
*Assistant Examiner* — Faezeh Forouharnejad
(74) *Attorney, Agent, or Firm* — Fiala & Weaver P.L.L.C.

(57) ABSTRACT

Systems, methods and computer program products are described herein that collect and analyze data generated by embedded systems included within a user's devices to generate recommendations for presentation to the user within the context of the user's web browser. The recommendations may comprise, for example, suggested information resources and/or search queries. Such recommendations may be presented to the user as part of a new tab page or within an address bar of the web browser's graphical user interface. In accordance with further embodiments, the user device data is used by a search engine to generate search results, and/or a ranking of search results.

18 Claims, 14 Drawing Sheets

(51) Int. Cl.
*G06Q 30/00* (2012.01)
*H04L 29/08* (2006.01)
*H04L 12/911* (2013.01)

(52) U.S. Cl.
CPC ............. *G06Q 30/00* (2013.01); *H04L 47/70* (2013.01); *H04L 67/12* (2013.01)

(56) References Cited

U.S. PATENT DOCUMENTS

| | | | | |
|---|---|---|---|---|
| 2014/0108943 | A1* | 4/2014 | Lee .................... | G06F 3/04817 715/738 |
| 2014/0207518 | A1* | 7/2014 | Kannan .............. | G06Q 30/0201 705/7.29 |
| 2014/0244568 | A1 | 8/2014 | Goel et al. | |
| 2015/0019342 | A1* | 1/2015 | Gupta ................ | G06Q 30/0269 705/14.66 |
| 2015/0142968 | A1* | 5/2015 | Bhagwat ................ | H04L 67/16 709/224 |

FOREIGN PATENT DOCUMENTS

| | | |
|---|---|---|
| GB | 2492198 A | 12/2012 |
| WO | 2013123445 A1 | 8/2013 |

OTHER PUBLICATIONS

"Second Written Opinion Issued in PCT Application No. PCT/US2015/065926", dated Nov. 3, 2016, 4 Pages.

"International Preliminary Report on Patentability Issued in PCT Application No. PCT/US2015/065926", dated Feb. 10, 2017, 8 Pages.

Vermesan, et al., "Internet of Things: Converging Technologies for Smart Environments and Integrated Ecosystems", River Publishers, Jun. 5, 2013, 363 pages.

"The Internet of Things (IOT)", Published on: Apr. 1, 2013, Available at: https://www.ida.gov.sg/~/media/Files/Infocomm%20Landscape/Technology/TechnologyRoadmap/InternetOfThings.pdf, 40 pages.

Kamal, et al., "Psychic: An autonomic inference engine for M2M management in Future Internet", In Proceedings of 15th Asia-Pacific Network Operations and Management Symposium, Sep. 25, 2013, 6 pages.

Mattern, et al., "From the Internet of Computers to the Internet of Things", In Proceedings of Lecture Notes in Computer Science, vol. 6462, Oct. 1, 2010, 18 pages.

Thebault, et al., "EnvB: An Environment-based Mobile Browser for the Web of Things", In Proceedings of the 27th International Conference on Human Factors in Computing Systems, Apr. 4, 2009, 4 pages.

Roduner, Christof, "BIT—A Browser for the Internet of Things", In Proceedings of the CIoT Workshop at the Eighth International Conference on Pervasive Computing, May 2010, 9 pages.

"The Microsoft Azure Intelligent Systems Service", Retrieved on: Sep. 16, 2014, Available at: http://www.microsoft.com/windowsembedded/en-us/intelligent-systems-service.aspx, 3 pages.

"International Search Report and Written Opinion Issued in PCT Application No. PCT/US2015/065926", dated Apr. 1, 2016, 13 Pages.

Guinard, et al., "From the Internet of Things to the Web of Things: Resource-oriented Architecture and Best Practices", In Proceedings of the Architecting the Internet of Things, Apr. 12, 2011, pp. 97-129.

Kenda, et al., "Mashups for the Web of Things", In Proceedings of the Semantic Mashups, Apr. 16, 2013, pp. 145-169.

Micarelli, et al., "Personalized Search on the World Wide Web", In Proceedings of the the Adaptive Web (vol. 4321 of the series Lecture Notes in Computer Science), Apr. 24, 2007, pp. 195-230.

"Office Action Issued in European Patent Application No. 15825699.0", dated Nov. 16, 2018, 6 Pages.

* cited by examiner

GENERATION OF BROWSER SUGGESTIONS BASED ON INTERNET OF THINGS DEVICE DATA

BACKGROUND

A web browser is a software application that is commonly used for retrieving, presenting and traversing information resources on the World Wide Web. Each information resource is identified by a Uniform Resource Locator (URL) and may be a web page, an image, a video, or other piece of content. Hyperlinks present in information resources enable users to easily navigate their web browsers to related information resources. Examples of modern web browsers include but are not limited to INTERNET EXPLORER®, published by Microsoft Corporation of Redmond, Wash., CHROME™, published by Google Inc. of Mountain View, Calif., FIREFOX®, published by the Mozilla Foundation of Mountain View, Calif., and SAFARI®, published by Apple Inc. of Cupertino, Calif. Although web browsers are primarily intended to navigate the World Wide Web, they can also be used to access information provided by web servers in private networks or files in file systems.

Web browsers typically obtain information based solely on input that is provided by a user at the time the information is being sought. For example, a user can direct a web browser to a particular information resource by typing the URL of the resource into an address bar of the web browser's user interface (UI). As another example, a user may access an Internet search engine via a web browser, and then obtain information by typing a search query into the search engine's UI that is presented within the context of the web browser. In either case, it may be difficult for the user to find useful information because the user must either know the URL of an information resource that provides useful information or the precise set of key words that will cause the search engine to identify information resources that include useful information.

Some web browsers enable a user to maintain a list of favorite or bookmarked web pages to provide easy access thereto. Some web browsers can also present frequently-accessed or recently-accessed URLs to a user via an address bar, a new tab page, or the like. Such features are limited in that they can only enable a user to navigate to information resources that they have accessed in the past. They do not help the user find new sources of information. Furthermore, some search engines can present a user with recommended search queries based on the user's prior search history or based on search queries that are currently trending among other users of the search engine. However, such recommended search queries are often not helpful in assisting the user in obtaining useful information at the time they need it.

SUMMARY

Systems, methods and computer program products are described herein that collect and analyze data generated by embedded systems included within a user's devices (e.g., a user's IoT devices) to create recommendations for presentation to the user within the context of the user's web browser. The recommendations may comprise, for example, suggested information resources (e.g., web pages, videos, or the like) and/or suggested search queries. Such recommendations may be presented to the user as part of a new tab page or within an address bar of the web browser's graphical user interface (GUI). Because embodiments generate the recommendations based on data that has been collected from the user's own devices (and in some embodiments from other instances of the same devices owned by others), the recommendations are likely to be relevant to the user. Moreover, because embodiments can collect and analyze user device data quickly, recommendations can be generated at a time that the user is likely to desire the recommended information. In accordance with other embodiments, the user device data is used by a search engine to provide more relevant search results and/or an improved ranking of search results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
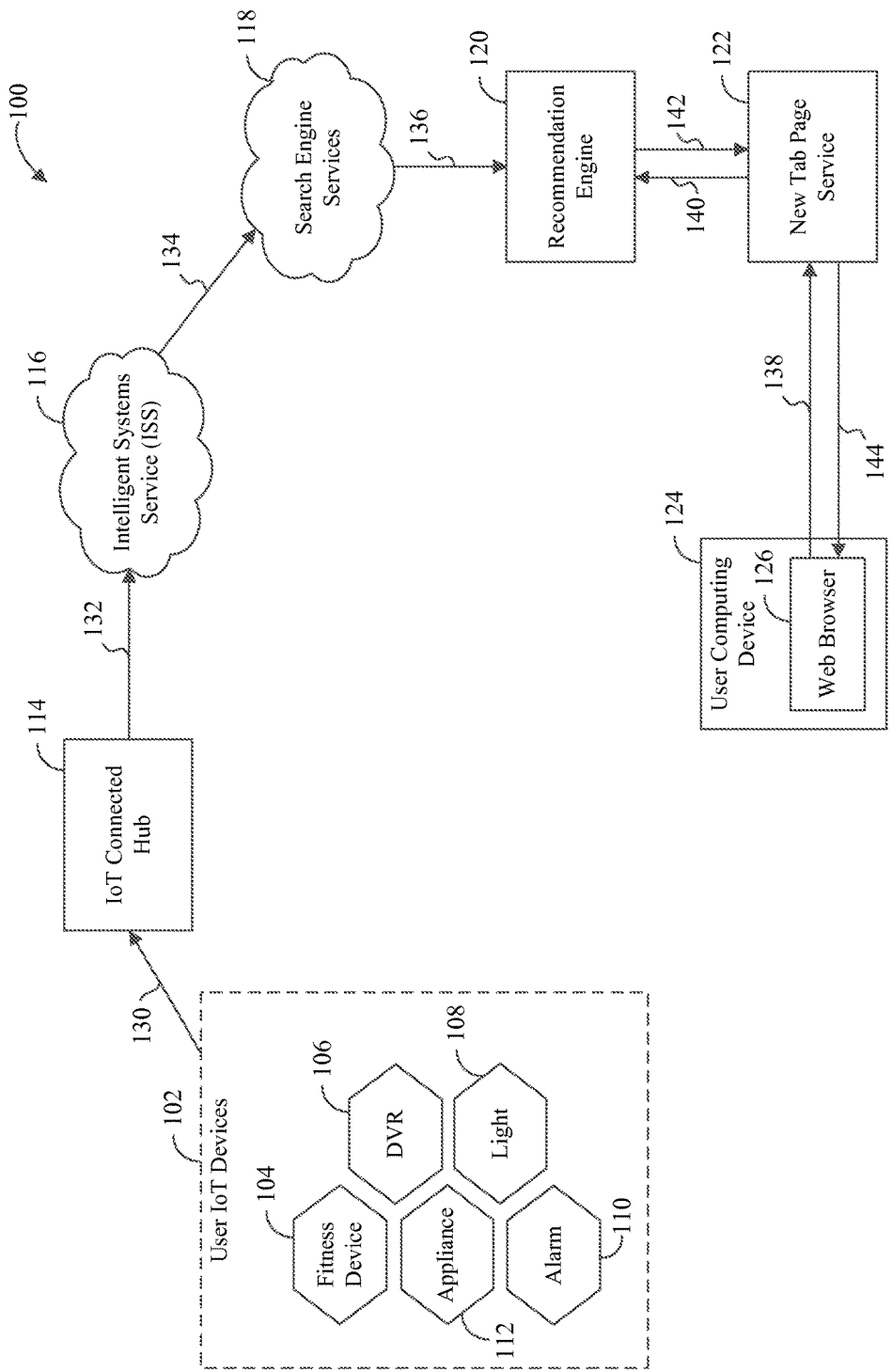
FIG. 1 is a block diagram of an example system that enables a web browser to provide a user thereof with automatically-generated information resource suggestions based on data obtained from the user's IoT devices.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods and computer program products are described herein that collect and analyze data output by embedded systems included within a user's devices to generate recommendations for presentation to the user within the context of the user's web browser. The recommendations may comprise, for example, suggested information resources (e.g., web pages, videos, or the like) and/or suggested search queries. Such recommendations may be presented to the user as part of a new tab page or within an address bar of the web browser's GUI. Because embodiments generate the recommendations based on data that has been collected from the user's own devices (and in some embodiments from other instances of the same devices owned by others), the recommendations are likely to be relevant to the user. Moreover, because embodiments can collect and analyze user device data quickly, such embodiments can generate recommendations at a time that the user is likely to desire the recommended information. In accordance with other embodiments, the user device data is used by a search engine to provide more relevant search results, and/or an improved ranking of search results.

The web browser is among the most commonly used applications by users seeking new information. Users rely on their web browsers to educate them, entertain them, communicate with others, and perform productivity-related tasks.

With the evolution of the Internet of Things (IoT), more and more devices are being connected to the Internet. Examples of such devices include, but are not limited to, major home appliances (such as washing machines, dryers, dishwashers, refrigerators, stoves, air conditioners, water heaters, or the like), small home appliances (such as coffee makers, microwave ovens, television sets, CD and DVD players, video game consoles, camcorders, cameras, clocks, alarm clocks, or the like), power outlets, security alarms, residential and commercial lighting, personal fitness devices, automotive devices, healthcare devices, manufacturing devices, energy management devices and retail devices.

Embodiments described herein are premised on the recognition that, as more and more devices are connected to the Internet, information output by these devices can be used to generate recommendations for web browser users, thereby making it easier for such users to access the content for which they are looking. Embodiments described herein achieve this by recommending content to a user based on the devices that the user owns and/or the current state of such devices.

In accordance with embodiments, a web browser provides a user with automatically-generated information resource (e.g., web page) suggestions and/or search query suggestions, wherein the information resource suggestions and/or search query suggestions are generated based on data collected from at least the user's own IoT devices. Such automatically-generated suggestions may be presented via a variety of different web browser GUI components or "surfaces", including a new tab page and an address bar. The presentation of these suggestions make it easy for the user to access desired information even when the user does not know an identifier (e.g., URL) of an information resource that provides the useful information or the precise set of key words that will cause a search engine to identify information resources that include useful information.

In accordance with various embodiments, information generated by a user's everyday devices are provided to a recommendation engine via one or more network-based communication channels. This information is then used by the recommendation engine to provide suggested content and searches directly to the user in the context of the user's web browser, thereby eliminating the need for the user to have to know about their devices and conduct searches manually (e.g., by entering in a speculative set of search terms). For example, when it is time to replace a filter in the user's ice maker, the user's web browser can provide relevant suggestions on the web browser's new tab page (or elsewhere), with links on where to purchase new filters and instructions on how to replace the filter.

In accordance with further embodiments, the user IoT device data is used by a search engine to generate more relevant search results for a user, and/or an improved ranking of search results for the user.

By enabling a user to more quickly locate desired network-accessible information such as web pages and the like, the embodiments described herein can improve the performance of the user computing device running the web browser by, for example, reducing power consumption, processor utilization, and network utilization by the device. This is because less time must be spent browsing to obtain desired information. Furthermore, by enabling users to more quickly locate desired network-accessible information, the embodiments described herein can reduce the utilization of network resources required to communicate with the backend resources that support web browsers and search engines, as well as reduce utilization of the backend resources themselves.

In the following sections, embodiments of the aforementioned systems, methods and computer program products will be more fully described. In particular, Section II describes systems, methods and computer program products that enable a web browser to provide a user thereof with automatically-generated information resource suggestions and/or search query suggestions based on data obtained from the user's own IoT devices. Section III describes systems, methods and computer program products that enable a search engine to return more relevant search results for a user and/or an improved ranking of search results for the user based on data obtained from the user's own IoT devices. Section IV describes an example mobile device that may be used to implement various embodiments. Section V describes an example processor-based computer system that may be used to implement various embodiments. Section VI describes some additional exemplary embodiments. Section VII provides some concluding remarks.

II. Providing a User with Recommendations Based on IoT Device Data

FIG. 1 is a block diagram of an example system 100 that enables a web browser to provide a user thereof with automatically-generated information resource suggestions based on data obtained from the user's own IoT devices. In the embodiment shown in FIG. 1, the information resource suggestions are displayed in a new tab page of the web browser. As shown in FIG. 1, system 100 includes a plurality of user IoT devices 102, an IoT connected hub 114, an Intelligent Systems Service (ISS) 116, search engine services 118, a recommendation engine 120, a new tab page service 122, and a user computing device 124 executing a web browser 126. Each of these elements of system 100 will now be described.

User IoT devices 102 are intended to represent devices owned, accessible by, or otherwise associated with a user. Each of user IoT devices 102 includes at least one embedded system that is capable of communicating information to at least one other entity via a wired or wireless connection. As used herein, the term "embedded system" is intended to broadly encompass any type of automated functionality that can be disposed within a device, including complex embedded computers as well as simple sensors. Each embedded system within user IoT devices 102 may be implemented in hardware (e.g., using digital and/or analog circuits), in software (e.g., software executed by one or more general-purpose and/or special-purpose processors), or as a combination of hardware and software.

User IoT devices 102 may include a wide variety of different types of devices including, but not limited to, major home appliances (such as washing machines, dryers, dishwashers, refrigerators, stoves, air conditioners, water heaters, or the like), small home appliances (such as coffee makers, microwave ovens, television sets, CD and DVD players, video game consoles, camcorders, cameras, clocks, alarm clocks, or the like), power outlets, security alarms, residential and commercial lighting, personal fitness devices, automotive devices, healthcare devices, manufacturing devices, energy management devices and retail devices.

Some specific examples of user IoT devices 102 are shown in FIG. 1. In particular, as shown in FIG. 1, user IoT devices 102 include a fitness device 104 (e.g., Microsoft's MICROSOFT BAND™ or any one of Fitbit's FITBIT® activity tracking devices), a digital video recorder (DVR) 106, a light 108, an alarm 110, and an appliance 112. These devices are presented by way of example only and are not intended to be limiting. Persons skilled in the relevant art(s) will appreciate that with the evolution of the IoT, embedded systems having the ability to automatically communicate with other entities will be integrated in more and more types of devices.

As noted above, each of the embedded systems disposed within user IoT devices 102 is operable to communicate information to one or more other entities via a wired or wireless connection. The type of information that may be communicated by a particular embedded system may vary by device or device type. For example, an embedded system within fitness device 104 may communicate information relating to user activity level, ultraviolet (UV) light exposure, heart rate, or the like. In contrast, an embedded system within DVR 106 may communicate information relating to device state (e.g., on/off, recording/not recording, etc.), stored programs, programs scheduled for future recording, an amount of unused storage space, or the like. As another example, an embedded system within light 108 may communicate information such as on/off state, an amount of time since a bulb was replaced, or the like.

The information that is output by a particular embedded system within user IoT devices 102 may be formatted in accordance with a particular schema. Such schema may be associated with a particular brand or model of device (e.g., a particular brand or model of washing machine) or with a class of device types (e.g., all washing machines). The schema associated with a device may indicate both the type of information elements that are included within the data output by the device and where such elements are located within a given communication payload. The schema may comprise, for example, an extended markup language (XML) schema, a JavaScript Object Notation (JSON) schema, or some other type of schema.

The manner by which each embedded system in user IoT devices 102 communicates with external entities may also vary. For example, an embedded system may utilize a communication protocol such as a BLUETOOTH® protocol or an IEEE 802.11 ("WiFi") protocol to wirelessly communicate with an external entity. However, these are only examples, and other radio frequency (RF) communication protocols or infrared (IR) communication protocols may be used to carry out wireless communication. In some embodiments, an embedded system utilizes a wired connection to communicate with an external entity. Communication over a wired connection may be carried out using a serial communication protocol (e.g., a Universal Serial Bus (USB) protocol) or other suitable communication protocol. A wired connection may also comprise, for example, a home power line network or a home phone line network.

In the system shown in FIG. 1, each embedded system in each of user IoT devices 102 is operable to communicate IoT device data to IoT connected hub 114. Such communication is generally represented by arrow 130. The times and frequency at which such communication occurs may vary by user IoT device 102. Furthermore, different user IoT devices 102 may communicate IoT device data to IoT connected hub 114 using different communication media and protocols. A given communication may be automatically triggered by a particular user IoT device 102 or may be carried out in response to a request from IoT connected hub 114.

IoT connected hub 114 is intended to represent a device that is capable of receiving IoT device data from each of the embedded systems integrated within user IoT devices 102. In one embodiment, IoT connected hub 114 comprises a home automation hub (such as an INSTEON® home automation hub, sold by Smartlabs, Inc. of Irvine, Calif.), although this is only an example. In an embodiment in which IoT connected hub 114 comprises a home automation hub, IoT connected hub 114 may communicate with each of user IoT devices 102 to provide a user with centralized monitoring and/or control over such devices.

The user may be required to take certain steps to connect supported user IoT devices to IoT connected hub 114, wherein the steps taken may vary depending on hub type and/or user IoT device type.

IoT connected hub 114 is further operable to aggregate IoT device data from each of the embedded systems in user IoT devices 102 and to pass such IoT device data to ISS service 116 over a wide area network (WAN), such as the Internet. The passing of such data is represented in FIG. 1 by arrow 132. New IoT device data may be passed from IoT connected hub 114 to ISS 116 continually although the times at which such data is passed and the frequency with which such data is passed may vary from implementation to implementation. The IoT device data that is passed from IoT connected hub 114 to ISS 116 includes an identifier (ID) of the user associated with user IoT devices 102. In one embodiment, the ID of the user comprises an account ID, such as a Microsoft Managed Service Account (MSA) ID.

In FIG. 1, all the IoT device data generated by the embedded systems in user IoT devices 102 is passed to ISS 116 via IoT connected hub 114. Thus, IoT connected hub 114 acts as a bridge between the embedded systems in user IoT devices 102 and the Internet. Such a bridge may be necessary because, although the embedded systems may be able to communicate over a wired or wireless medium, they may not support a full Internet stack. Of course, in instances in which an embedded system supports a full Internet stack, it is possible that the embedded system may communicate IoT device data directly to ISS 116.

ISS 116 represents a set of cloud-based services for securely collecting, managing and reporting machine-generated data via the Internet. These services are executed on one or more processor-based computing devices (e.g., servers). In one embodiment, ISS 116 comprises the Microsoft AZURE™ Intelligent Systems Service published by Microsoft Corporation of Redmond, Wash. However, this is an example only, and ISS 116 may comprise any service capable of collecting IoT device data from IoT connected hub 114 and other entities over the Internet. ISS 116 operates to provide a data feed 134 of the IoT device data received from IoT connected hub 114 (as well as from other entities, including but not limited to other IoT connected hubs) to search engine services 118.

Search engine services 118 comprise a set of services for supporting a search engine (e.g., Microsoft's BING® search engine) and for otherwise assisting users in obtaining desired information via their computing devices. These services are executed on one or more processor-based computing devices (e.g., servers). In the embodiment depicted in FIG. 1, data feed 134 is passed by search engine services 118 to recommendation engine 120 so that recommendation engine 120 can use the data included therein to generate information resource recommendations for the user in response to a request from new tab page service 122. Like search engine services 118, recommendation engine 120 and new tab page service 122 are each executed on one or more processor-based computing devices (e.g., servers). The passing of the IoT device data from search engine services 118 to recommendation engine 120 is represented in FIG. 1 by arrow 136.

Upon receiving the IoT device data, recommendation engine 120 operates to extract information elements (e.g., device ID, device type, device model, device state information, device error codes, or the like) from the data that can be used to identify information resources that may be of interest to the user. In particular, recommendation engine 120 extracts information elements from the IoT device data by decoding the data using an appropriate schema. For example, recommendation engine 120 may utilize a schema for washing machines to extract information elements from IoT data obtained from a washing machine. Recommendation engine 120 can then use the extracted information elements to search for network-accessible content (e.g., web pages, videos, images or the like) that may be of interest to the user.

Depending upon the implementation, recommendation engine 120 may simply extract the information elements from the IoT device data and then store the information elements in association with the user ID that was provided with the IoT device data. Then, when a request is received from new tab page service 122 to provide one or more recommended information resources for the user identified by the user ID, recommendation engine 120 may utilize the information elements to conduct a search therefor. In an alternate implementation, recommendation engine 120 may conduct a search for recommended information resources using the information elements prior to receiving any request from new tab page service 122. In accordance with such an alternate implementation, recommendation engine 120 may then store identifiers (e.g., URLs) of the information resources discovered by the search in association with the user ID. Such identifiers can later be quickly accessed in response to a request from a new tab page service 122.

In further accordance with system 100 of FIG. 1, the user associated with user IoT devices 102 interacts with web browser 126 that is executing on user computing device 124. User computing device 124 may comprise any device that is capable of executing a web browser. For example and without limitation, user computing device 124 may comprise a desktop computer, a laptop computer, a tablet computer, a netbook, a smartphone, a gaming console, a smart TV, or the like.

While interacting with web browser 126, the user causes a new tab page to be displayed within a GUI of web browser 126. For example, the user may cause the new tab page to be displayed by launching the web browser or by clicking on a "new tab" GUI component of web browser 126. When this occurs, the new tab page sends a request for new tab page content 138 over the Internet to new tab page service 122. Request 138 includes or is otherwise associated with the user's user ID (e.g., MSA ID). Web browser 126 may have access to this user ID because, for example, the user may have logged onto his/her account via web browser 126 using his/her user ID.

Upon receiving request 138, new tab page service 122 sends a query 140 to recommendation engine 120. Query 140 comprises a request for a list of recommended information resources to be included in the new tab page. Query 140 includes the user ID of the user.

In response to receiving query 140, recommendation engine 120 generates a list of recommended information resources. In one embodiment, recommendation engine 120 uses the user ID included in query 140 to access a set of IoT device data information elements associated with the user identified by the user ID. Recommendation engine 120 then uses the information elements to conduct a search for information resources (e.g., web pages, videos, images or the like) that may be of interest to the user. The results of the search, which may comprise a list of information resource identifiers (e.g., URLs), are then provided to new tab page service 122 as part of query response 142. In an alternate embodiment, such a search may be performed ahead of time and the results stored in association with user ID by recommendation engine 120. In accordance with such an embodiment, recommendation engine 120 users the user ID included in query 140 to access the previously-stored list of recommended information resources and returns the list as part of query response 142.

After receiving query response 142 which includes the list of recommended information resources, new tab page service 122 dynamically builds the contents of the new tab page. The contents of the new tab page include information about the recommended information resources from query response 142, and may include an identifier (e.g., URL) of each such recommended information resource. New tab page service then returns the contents of the new tab page 144 to web browser 126. Web browser 126 then displays the contents of the new tab page within the new tab page that has been opened by the user.

Figure 2:
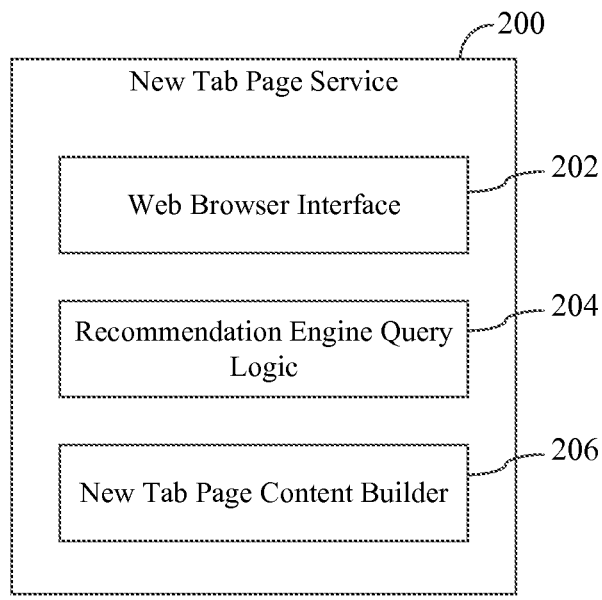
FIG. 2 is a block diagram of an example new tab page service in accordance with an embodiment.

FIG. 2 is a block diagram of an example new tab page service 200 in accordance with an embodiment. New tab page service 200 may comprise an example implementation of new tab page service 122 of FIG. 1. As shown in FIG. 2, new tab page service 200 includes a web browser interface 202, recommendation engine query logic 204, and a new tab page content builder 206. Each of these components may be implemented in software (e.g., software executed by one or more general-purpose and/or special-purpose processors), in hardware (e.g., using digital and/or analog circuits), or as a combination of software and hardware. In one embodiment, one or more of the components are implemented on one or more server computers.

Web browser interface 202 comprises logic that is operable to receive requests for new tab page content from web browsers executing on client devices, such as web browser 126 executing on user computing device 124, and to transmit responses to such requests back to such client devices. The responses include content for inclusion in a new tab page portion of a web browser's GUI.

Recommendation engine query logic 204 comprises logic that is operable to generate and send a query to a recommendation engine, such as recommendation engine 120, in response to the receipt of a client request for new tab content page via web browser interface 202. In an embodiment, the query comprises a request for a list of one or more recommended information resources. The query may also include or otherwise be associated with a particular user ID. Recommendation engine query logic 204 further comprises logic that is operable to receive a list of one or more recommended information resources from the recommendation engine and to provide the list to new tab page content builder 206.

New tab page content builder 206 comprises logic that is operable to dynamically build new tab page content in response to the receipt of a client request for new tab content page via web browser interface 202. Such content may include information about recommended information resources received from recommendation engine query logic 204 and may include an identifier (e.g., URL) of each such recommended information resource. The new tab page content generated by new tab page content builder 206 is provided to web browser interface 202 to be transmitted to the web browser that requested the content.

Figure 3:
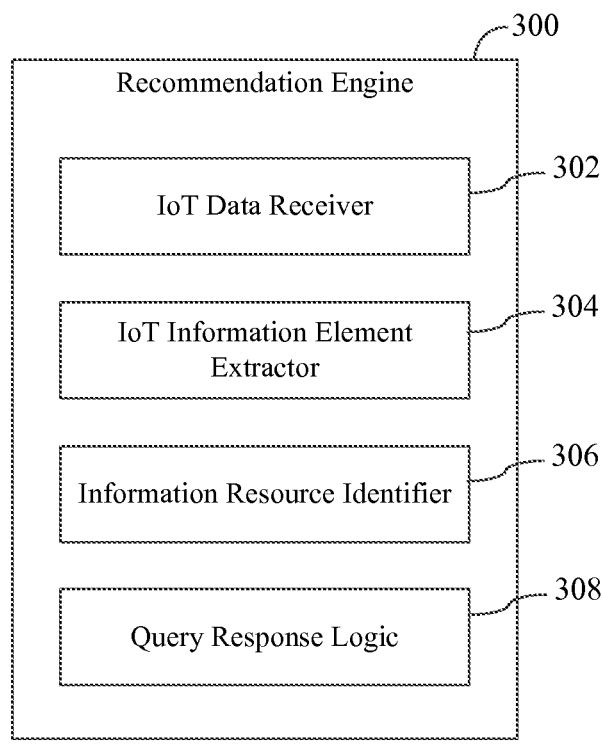
FIG. 3 is a block diagram of an example recommendation engine in accordance with an embodiment.

FIG. 3 is a block diagram of an example recommendation engine 300 in accordance with an embodiment. Recommendation engine 300 may comprise an example implementation of recommendation engine 120 of FIG. 1. As shown in FIG. 3, recommendation engine 300 includes an IoT data receiver 302, an IoT information element extractor 304, an information resource identifier 306, and query response logic 308. Each of these components may be implemented in software (e.g., software executed by one or more general-purpose and/or special-purpose processors), in hardware (e.g., using digital and/or analog circuits), or as a combination of software and hardware. In one embodiment, one or more of the components are implemented on one or more server computers.

IoT data receiver 302 comprises logic that is operable to receive IoT device data that originates from embedded systems disposed within devices associated with various users. Such IoT device data may be collected by any number of IoT connected hubs (such as IoT connected hub 114 of FIG. 1) and conveyed to an ISS service (such as ISS service 116 of FIG. 1) thereby, and then conveyed from the ISS service to search engine services (such as search engine services 118 of FIG. 1). The search engine services provide the IoT device data to recommendation engine 300. However, IoT data receiver 302 may receive the IoT device data in other ways as well. In an embodiment, IoT data receiver 302 receives IoT device data for a number of users, and the IoT device data for a particular user is identified by means of a user ID that is associated with such IoT device data.

IoT information element extractor 304 comprises logic that is operable to extract information elements (e.g., device ID, device type, device model, device state information, device error codes, or the like) from the IoT device data. In particular, IoT information element extractor 304 is operable to extract information elements from the IoT device data by decoding the data using an appropriate schema. IoT information element extractor 304 may store the extracted information elements for a particular set of IoT device data in association with a particular user ID.

Information resource identifier 306 comprises logic that is operable to utilize the information elements associated with a particular user ID to conduct a search for one or more recommended information resources for the user identified by the particular user ID. For example, information resource identifier 306 may utilize the information elements as search terms in a search of an index of network-accessible information resources. In an embodiment, information resource identifier 306 is operable to conduct such a search in response to the receipt of a query from a new tab page service (such as new tab page service 122 of FIG. 1) that includes or is otherwise associated with the user ID. In another embodiment, information resource identifier 306 may conduct a search for recommended information resources for a particular user ID using the information elements associated with that user ID prior to receiving any request from a new tab page service. In accordance with such an embodiment, information resource identifier 306 may store identifiers (e.g., URLs) of the recommended information resources discovered by the search in association with the user ID. Such identifiers can later be quickly accessed in response to a request from a new tab page service.

Query response logic 308 comprises logic that is operable to receive queries from a new tab page service (e.g., new tab page service 122 of FIG. 1 or new tab page service 200 of FIG. 2) and to respond to such queries by providing a list of recommended information resources generated by information resource identifier 306. In an embodiment, each query received from the new tab page service includes a user ID and query response logic 308 operates to provide the user ID to information resource identifier 306 so that information resource identifier 306 can generate a list of recommended information resources for the user identified by the particular user ID. In one embodiment, the list of recommended information resources that is returned to the new tab page service by query response logic 308 comprises a list of URLs of recommended information resources.

Figure 4:
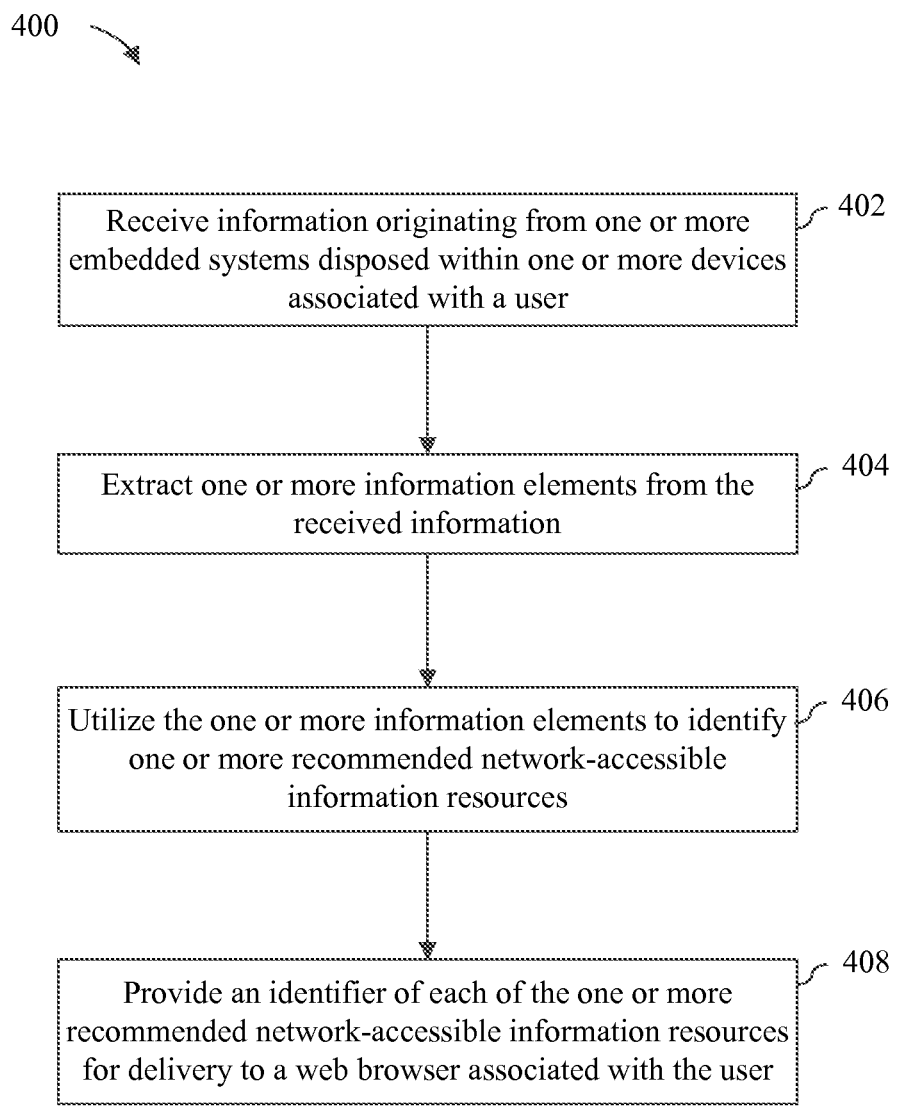
FIG. 4 depicts a flowchart of a method performed by a recommendation engine for providing a web browser with information about one or more recommended network-accessible information resources based on data obtained from a user's IoT devices in accordance with an embodiment.

FIG. 4 depicts a flowchart 400 of a method performed by a recommendation engine for providing a web browser with a list of recommended network-accessible information resources based on data obtained from a user's IoT devices in accordance with an embodiment. The method of flowchart 400 may be implemented, for example, by recommendation engine 120 of FIG. 1 or by recommendation engine 300 of FIG. 3. However, the method is not limited to those embodiments.

As shown in FIG. 4, the method of flowchart 400 begins at step 402, in which information is received, the information originating from one or more embedded systems disposed within one or more devices associated with a user. In an embodiment, the information is obtained from at least one IoT connected hub that receives the information from the one or more embedded systems via a wired or wireless connection thereto. In an embodiment, step 402 is performed by IoT data receiver 302 of recommendation engine 300.

At step 404, one or more information elements are extracted from the information received during step 402. In an embodiment, this step comprises identifying a device type and/or device model associated with a device from at which at least a portion of the received information originated. Then, a predefined schema associated with the device type and/or device model is applied to at least a portion of the received information to identify at least one of the one or more information elements. In further accordance with such an embodiment, the predefined schema may comprise an XML schema or a JSON schema, although these are only examples. In an embodiment, step 404 is performed by IoT information element extractor 304 of recommendation engine 300.

At step 406, the one or more information elements extracted during step 404 are utilized to identify one or more recommended network-accessible information resources. Each network-accessible information resource may comprise, for example and without limitation, a web site, web page, image, video, or the like. Utilizing the one or more information elements to identify the one or more recommended network-accessible information resources may comprise, for example, utilizing the one or more information elements as search terms in a query that is conducted against an index of network-accessible information resources. In an embodiment, step 406 is performed by information resource identifier 306 of recommendation engine 300.

At step 408, an identifier of each of the one or more recommended network-accessible information resources is provided for delivery to a web browser associated with the user. This step may comprise, for example, providing the identifier of each of the one or more recommended network-accessible information resources to a new tab page service that dynamically constructs new tab page content for delivery to the web browser. The new tab page content includes information about each of the one or more recommended network-accessible information resources. Step 408 may be performed, for example, in response to receipt of a request for new tab page content from the web browser. In an embodiment, step 408 is performed by query response logic 308 of recommendation engine 300.

Figure 5:
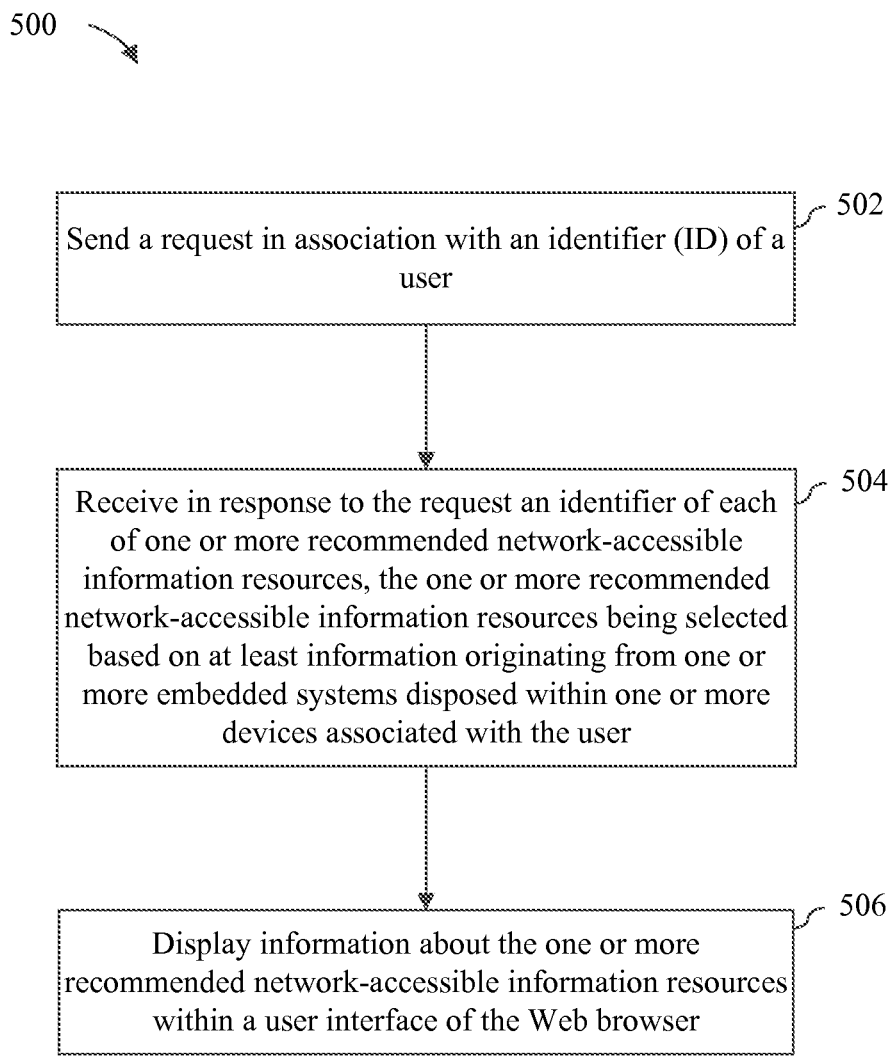
FIG. 5 depicts a flowchart of a method performed by a web browser for providing a user thereof with information about one or more recommended network-accessible information resources based on data obtained from the user's IoT devices in accordance with an embodiment.

FIG. 5 depicts a flowchart 500 of a method performed by a web browser for providing a user thereof with a list of recommended network-accessible information resources based on data obtained from the user's IoT devices in accordance with an embodiment. The method of flowchart 500 may be implemented, for example, by web browser 126 of FIG. 1. However, the method is not limited to that embodiment.

As shown in FIG. 5, the method of flowchart 500 begins at step 502, in which the web browser sends a request in association with an identifier (ID) of a user. The user ID may comprise, for example, a Microsoft MSA ID as previously described or any other ID suitable for identifying a particular user. The request may be sent, for example, to a new tab page service such as new tab page service 122 of FIG. 1 or new tab page service 200 of FIG. 2.

At step 504, in response to the request, the web browser receives an identifier of each of one or more recommended network-accessible information resources. The one or more network-accessible information resources are selected based on at least information originating from one or more embedded systems disposed within one or more devices associated with the user. In an embodiment, the information is obtained from at least one IoT connected hub that receives the information from the one or more embedded systems via a wired or wireless connection thereto. The identifier(s) received during step 504 may be received, for example, from a new tab page service such as new tab page service 122 of FIG. 1 or new tab page service 200 of FIG. 2.

At step 506, the web browser displays information about the one or more recommended network-accessible information resources within a UI of the web browser. For example, the web browser may display information about the one or more recommended network-accessible information resources within a new tab page portion of a GUI of the web browser.

Figure 6:
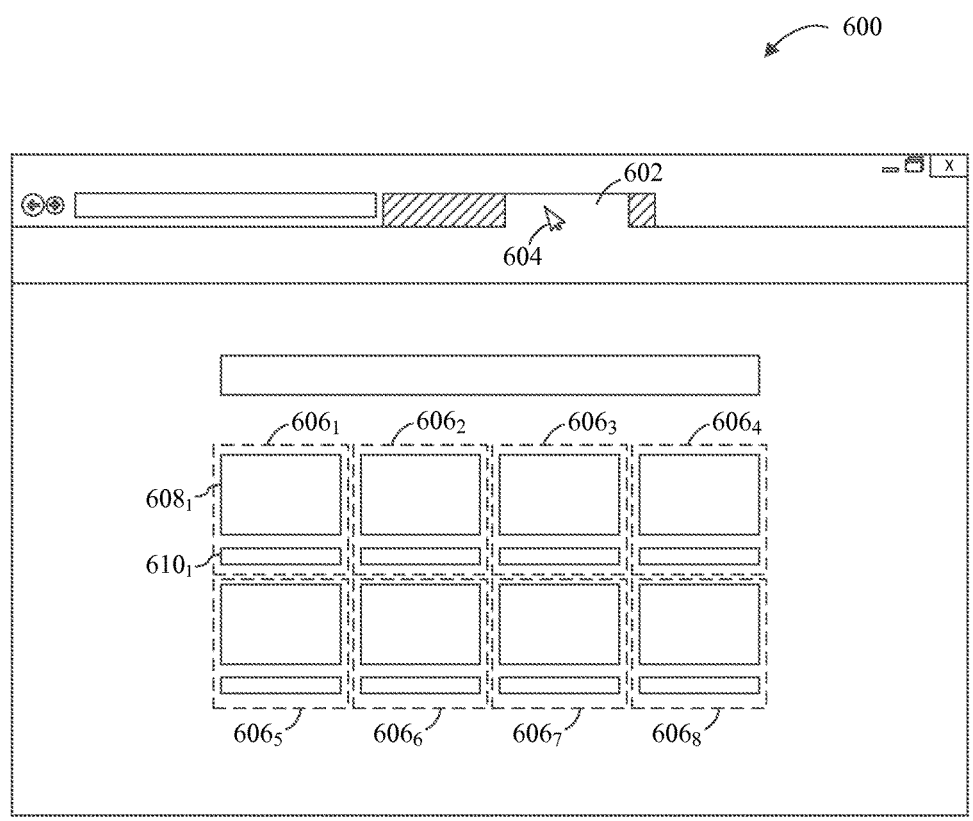
FIG. 6 illustrates an example web browser GUI that displays information resource recommendations to a user within a new tab page, the information resource recommendations being based on the user's own IoT device data in accordance with an embodiment.

FIG. 6 illustrates an example web browser GUI 600 that displays information resource recommendations to a user within a new tab page, wherein the information resource recommendations are based on the user's own IoT device data. As shown in FIG. 6, GUI 600 includes a new tab page activation component 602 (in the shape of a tab) that a user has clicked on with a pointer 604. Pointer 604 may be controlled by a user input device such as a mouse. Of course, other methods of interacting with component 602 are possible. For example, in an embodiment in which the web browser is running on a device with a touch screen, the user may interact with component 602 by touching a portion of the touch screen above component 602. In any case, by interacting with component 602, the user causes the web browser to send a request for new tab page content to a new tab page service (such as new tab page service 122 of FIG. 1 or new tab page service 200 of FIG. 2). The new tab page content is then returned by the new tab page service to the web browser, which displays the content within GUI 600.

As further shown in FIG. 6, the new tab page content that is returned from the new tab page service includes information about recommended information resources, wherein each recommended information resource is represented by a set of information $606_1$-$606_8$. In the example GUI shown in FIG. 6, each set of information includes a thumbnail image that represents a recommended information resource and an identifier (e.g., URL) of the recommended information resource. For example, set of information $606_1$ includes a thumbnail image $608_1$ and an identifier $610_1$. In an embodiment, clicking on either the thumbnail image or the identifier will cause the web browser to navigate to the recommended information resource associated therewith.

As was previously described, each information resource about which information is displayed in GUI 600 may advantageously be recommended based on IoT device data obtained from one or more devices owned or otherwise associated with a user. Thus, for example, in a scenario in the user's washing machine is malfunctioning and reporting a particular error code, one or more of the recommended information resources may comprise information resources that deal with repairing the model of washing machine owned by the user when the washing machine is reporting the particular error code. For example, the information resources that are recommended may comprise the washing machine manufacturer's web site, web pages that discuss how to repair the washing machine, web pages that describe the meaning of the error code, how-to videos about repairing the washing machine, web pages associated with local washing machine repair services, or the like. Additional example scenarios that describe how user IoT device data may be used to drive information resource suggestions will be described herein.

Figure 7:
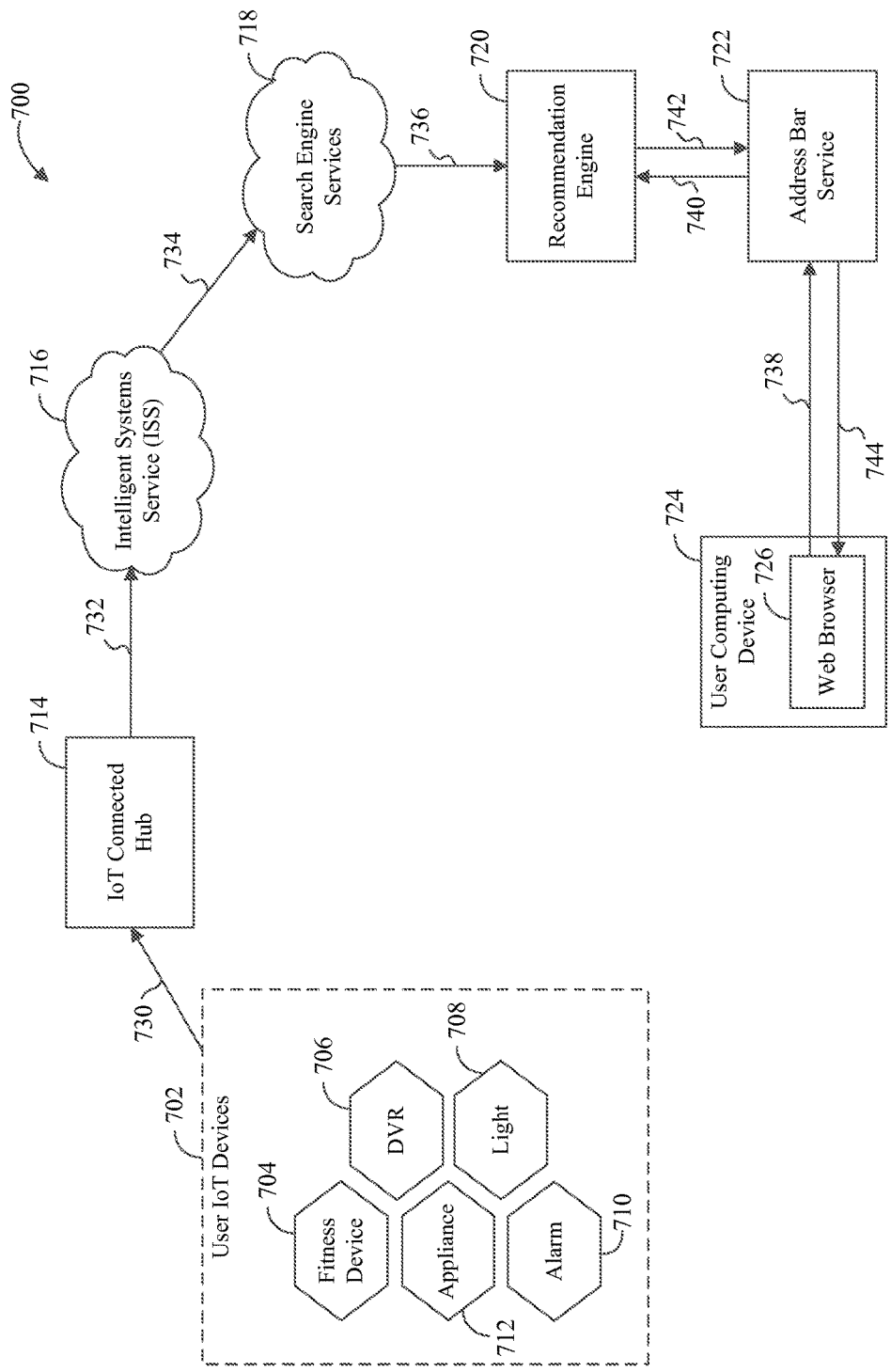
FIG. 7 is a block diagram of an example system that enables a web browser to provide a user thereof with automatically-generated information resource suggestions and search query suggestions based on data obtained from the user's own IoT devices.

FIG. 7 is a block diagram of an example system 700 that enables a web browser to provide a user thereof with automatically-generated information resource suggestions and search query suggestions based on data obtained from the user's own IoT devices. In the embodiment shown in FIG. 7, the information resource suggestions and search query suggestions are displayed in an address bar drop-down menu of the web browser. As shown in FIG. 7, system 700 includes a plurality of user IoT devices 702, an IoT connected hub 714, an ISS 716, search engine services 718, a recommendation engine 720, an address bar service 722, and a user computing device 724 executing a web browser 726. Each of these elements of system 700 will now be described.

User IoT devices 702 (including fitness device 704, DVR 706, light 708, alarm 710 and appliance 712), IoT connected hub 714, ISS 716, search engine services 718, user computing device 724 and web browser 726 are implemented in a substantially similar manner as user IoT devices 102 (including fitness device 104, DVR 106, light 108, alarm 110 and appliance 112), IoT connected hub 114, ISS 116, search engine services 118, user computing device 124 and web browser 126 of FIG. 1, respectively, and operate to perform substantially similar functions. Consequently, an extensive description of those components will not be provided herein for the sake of brevity.

Each embedded system in each of user IoT devices 702 is operable to communicate IoT device data to IoT connected hub 714. Such communication is generally represented by arrow 730 in FIG. 7. IoT connected hub 714 is operable to aggregate IoT device data from each of the embedded systems in user IoT devices 702 and to pass such IoT device data to ISS service 716 over the Internet or other network. The passing of such data is represented in FIG. 7 by arrow 732. The IoT device data that is passed from IoT connected hub 714 to ISS 716 includes an ID of the user associated with user IoT devices 702.

ISS 716 operates to provide a feed 734 of the IoT device data received from IoT connected hub 714 (as well as from other entities, including but not limited to other IoT connected hubs) to search engine services 718. Search engine services 718 passes the IoT device data to recommendation engine 720 so that recommendation engine 720 can use such data to generate information resource recommendations and/or search query recommendations for the user in response to a request from address bar service 722. Recommendation engine 720 and address bar service 722 are each executed on one or more processor-based computing devices (e.g., servers). The passing of the IoT device data from search engine services 718 to recommendation engine 720 is represented in FIG. 7 by arrow 736.

Upon receiving the IoT device data, recommendation engine 720 operates to extract information elements (e.g., device ID, device type, device model, device state information, device error codes, or the like) from the data that can be used to identify information resources that may be of interest to the user and/or to generate recommended search queries for the user. In particular, recommendation engine 720 extracts information elements from the IoT device data by decoding the data using an appropriate schema. For example, recommendation engine 720 may utilize a schema for washing machines to extract information elements from IoT data obtained from a washing machine. Recommendation engine 720 can then use the extracted information elements to search for network-accessible content (e.g., web pages, videos, images or the like) that may be of interest to the user and/or to generate recommended search queries for the user.

Depending upon the implementation, recommendation engine 720 may simply extract the information elements from the IoT device data and then store the information elements in association with the user ID provided with the IoT device data. Then, when a request is received from address bar service 722 to provide one or more recommended information resources and/or one or more recommended search queries for the user identified by the user ID, recommendation engine 720 may utilize the information elements to conduct a search for such information resources and/or to generate such search queries. In an alternate implementation, recommendation engine 720 may conduct a search for recommended information resources and/or generate recommended search queries using the information elements prior to receiving any request from address bar service 722. In accordance with such an alternate implementation, recommendation engine 720 may then store the identifiers (e.g., URLs) of the information resources discovered by the search and/or the generated search queries in association with the user ID. Such identifiers and/or search queries can later be quickly accessed in response to a request from address bar service 722.

In further accordance with system 700 of FIG. 7, the user associated with user IoT devices 702 interacts with web browser 726 that is executing on user computing device 724. While interacting with web browser 726, the user may interact with an address bar that is displayed within a GUI of web browser 726. For example, the user may interact with the address bar by simply clicking on the address bar or by entering one or more characters into the address bar. When this occurs, web browser 726 sends a request for address bar recommendations 738 over the Internet to address bar service 722. Request 738 includes or is otherwise associated with the user's user ID (e.g., MSA ID). Web browser 726 may have access to this user ID because, for example, the user may have logged onto his/her account via web browser 726 using his/her user ID.

Upon receiving request 738, address service 722 sends a query 740 to recommendation engine 720. Query 740 comprises a request for a list of recommended information resources and/or recommended search queries to be displayed in the address bar. Query 740 includes the user ID of the user. In an embodiment, if the user has already starting typing in the address bar, query 740 may also include the text that the user has already typed into the text bar.

In response to receiving query 740, recommendation engine 720 generates a list of recommended information resources and/or recommended search queries. In one embodiment, recommendation engine 720 uses the user ID included in query 740 to access a set of IoT device data information elements associated with the user identified by the user ID. Recommendation engine 720 then uses the information elements to conduct a search for information resources (e.g., web pages, videos, images or the like) that may be of interest to the user and/or to generate recommended search queries for the user. The results of the search, which may comprise a list of information resource identifiers (e.g., URLs), and/or the recommended search queries are then provided to address bar service 722 as part of query response 742. In an alternate embodiment, the search for information resources and/or generation of search queries may be performed ahead of time and the results stored in association with user ID by recommendation engine 720. In accordance with such an embodiment, recommendation engine 720 uses the user ID included in query 740 to access the previously-stored list of recommended information resources and/or search queries and returns the list as part of query response 742. In certain embodiments, recommendation engine 720 considers any text that the user has already typed into the address bar in selecting recommended information resources or recommended search queries.

After receiving query response 742 which includes the list of recommended information resources and/or recommended search queries, address bar 722 dynamically builds content to be displayed in an address bar drop-down menu of web browser 726. The content may include an identifier (e.g., URL) of each recommended information resource and/or one or more recommended search queries. Address bar service 722 then returns the content to web browser 726. Web browser 726 then displays the content within the address bar drop-down menu.

Figure 8:
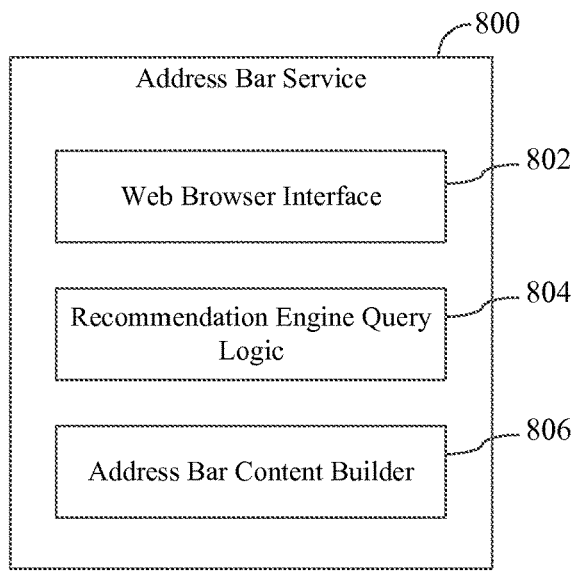
FIG. 8 is a block diagram of an example address bar service in accordance with an embodiment.

FIG. 8 is a block diagram of an example address bar service 800 in accordance with an embodiment. Address bar service 800 may comprise an example implementation of address bar service 722 of FIG. 7. As shown in FIG. 8, address bar service 800 includes a web browser interface 802, recommendation engine query logic 804, and an address bar content builder 806. Each of these components may be implemented in software (e.g., software executed by one or more general-purpose and/or special-purpose processors), in hardware (e.g., using digital and/or analog circuits), or as a combination of software and hardware. In one embodiment, one or more off the components are implemented on one or more server computers.

Web browser interface 802 comprises logic that is operable to receive requests for address bar content from web browsers executing on client devices, such as web browser 726 executing on user computing device 724, and to transmit responses to such requests back to such client devices. The responses include content for inclusion in an address bar drop-down menu of a web browser's GUI.

Recommendation engine query logic 804 comprises logic that is operable to generate and send a query to a recommendation engine, such as recommendation engine 720, in response to the receipt of a client request for address bar content page via web browser interface 802. In an embodiment, the query comprises a request for a list of one or more recommended information resources and/or one or more recommended search queries. The query may also include or otherwise be associated with a particular user ID. The query may still further include text that a user has already typed into the address bar. Recommendation engine query logic 804 further comprises logic that is operable to receive a list of one or more recommended information resources and/or one or more recommended search queries from the recommendation engine and to provide the list to address bar content builder 806.

Address bar content builder 806 comprises logic that is operable to dynamically assemble address bar content in response to the receipt of a client request for address bar content page via web browser interface 802. Such content may include information about recommended information resources and/or recommended search queries received from recommendation engine query logic 804. The address bar content generated by address bar content builder 806 is provided to web browser interface 802 to be transmitted to the web browser that requested the content.

Figure 9:
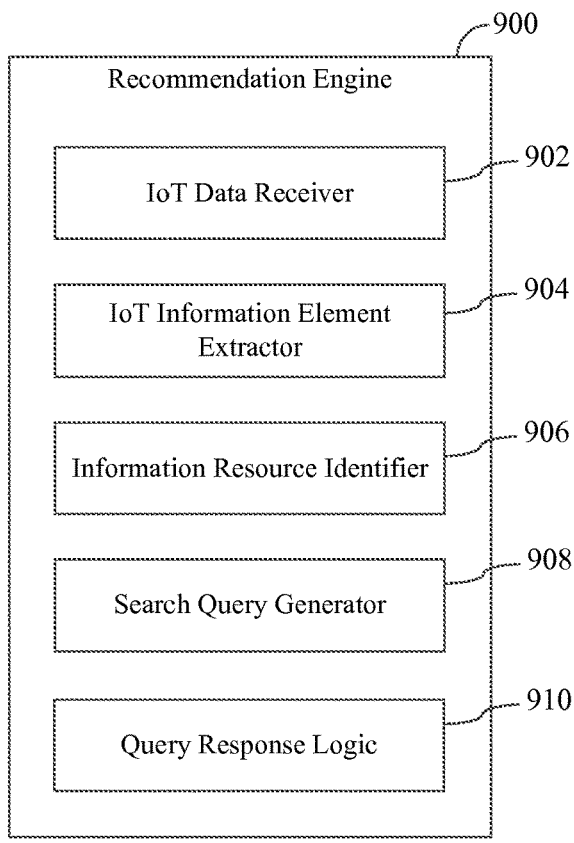
FIG. 9 is a block diagram of an example recommendation engine in accordance with an embodiment.

FIG. 9 is a block diagram of an example recommendation engine 900 in accordance with an embodiment. Recommendation engine 900 may comprise an example implementation of recommendation engine 720 of FIG. 7. As shown in FIG. 9, recommendation engine 900 includes an IoT data receiver 902, an IoT information element extractor 904, an information resource identifier 906, a search query generator 908 and query response logic 910. Each of these components may be implemented in software (e.g., software executed by one or more general-purpose and/or special-purpose processors), in hardware (e.g., using digital and/or analog circuits), or as a combination of software and hardware. In one embodiment, one or more of the components are implemented on one or more server computers.

IoT data receiver 902 comprises logic that is operable to receive IoT device data that originates from embedded systems disposed within devices associated with various users. Such IoT device data may be collected by any number of IoT connected hubs (such as IoT connected hub 714 of FIG. 7) and conveyed to an ISS service (such as ISS service 716 of FIG. 7) thereby, and then conveyed from the ISS service to search engine services (such as search engine services 718 of FIG. 7). The search engine services provide the IoT device data to recommendation engine 900. However, IoT data receiver 902 may receive the IoT device data in other ways as well. In an embodiment, IoT data receiver 902 receives IoT device data for a number of users, and the IoT device data for a particular user is identified by means of a user ID that is associated with such IoT device data.

IoT information element extractor 904 comprises logic that is operable to extract information elements (e.g., device ID, device type, device model, device state information, device error codes, or the like) from the IoT device data. In particular, IoT information element extractor 904 is operable to extract information elements from the IoT device data by decoding the data using an appropriate schema. IoT information element extractor 904 may store the extracted information elements for a particular set of IoT device data in association with a particular user ID.

Information resource identifier 906 comprises logic that is operable to utilize the information elements associated with a particular user ID to conduct a search for one or more recommended information resources for the user identified by the particular user ID. For example, information resource identifier 906 may utilize the information elements as search terms in a search of an index of network-accessible information resources. In an embodiment, information resource identifier 906 is operable to conduct such a search in response to the receipt of a query from an address bar service (such as address bar service 722 of FIG. 7) that includes or is otherwise associated with the user ID. In another embodiment, information resource identifier 906 may conduct a search for recommended information resources for a particular user ID using the information elements associated with that user ID prior to receiving any request from an address bar service. In accordance with such an embodiment, information resource identifier 906 may store identifiers (e.g., URLs) of the recommended information resources discovered by the search in association with the user ID. Such identifiers can later be quickly accessed in response to a request from an address bar service.

Search query generator 908 comprises logic that is operable to utilize the information elements associated with a particular user ID to generate one or more recommended search queries for the user identified by the particular user ID. For example, search query generator 908 may utilize the information elements as components of a recommended search query or as keywords to be used in a search for a recommended search query. In an embodiment, search query generator 908 is operable to generate one or more recommended search queries in response to the receipt of a query from an address bar service (such as address bar service 722 of FIG. 7) that includes or is otherwise associated with the user ID. In another embodiment, search query generator 908 may generate recommended search queries for a particular user ID using the information elements associated with that user ID prior to receiving any request from an address bar service. In accordance with such an embodiment, search query generator 908 may store the recommended search queries in association with the user ID. Such identifiers can later be quickly accessed in response to a request from an address bar service.

Query response logic 910 comprises logic that is operable to receive queries from an address bar service (e.g., address bar service 722 of FIG. 7) and to respond to such queries by providing a list of recommended information resources generated by information resource identifier 906 and/or a list of recommended search queries generated by search query generator 908. In an embodiment, each query received from the address bar service includes a user ID and query response logic 910 operates to provide the user ID to information resource identifier 906 so that information resource identifier 906 can generate a list of recommended information resources for the user identified by the particular user ID. In one embodiment, the list of recommended information resources that is returned to the address bar service by query response logic 910 comprises a list of URLs of recommended information resources. Query response logic 910 may further operate to provide the user ID to search query generator 908 so that search query generator 908 can generate a list of recommended search queries for the user identified by the particular user ID.

Figure 10:
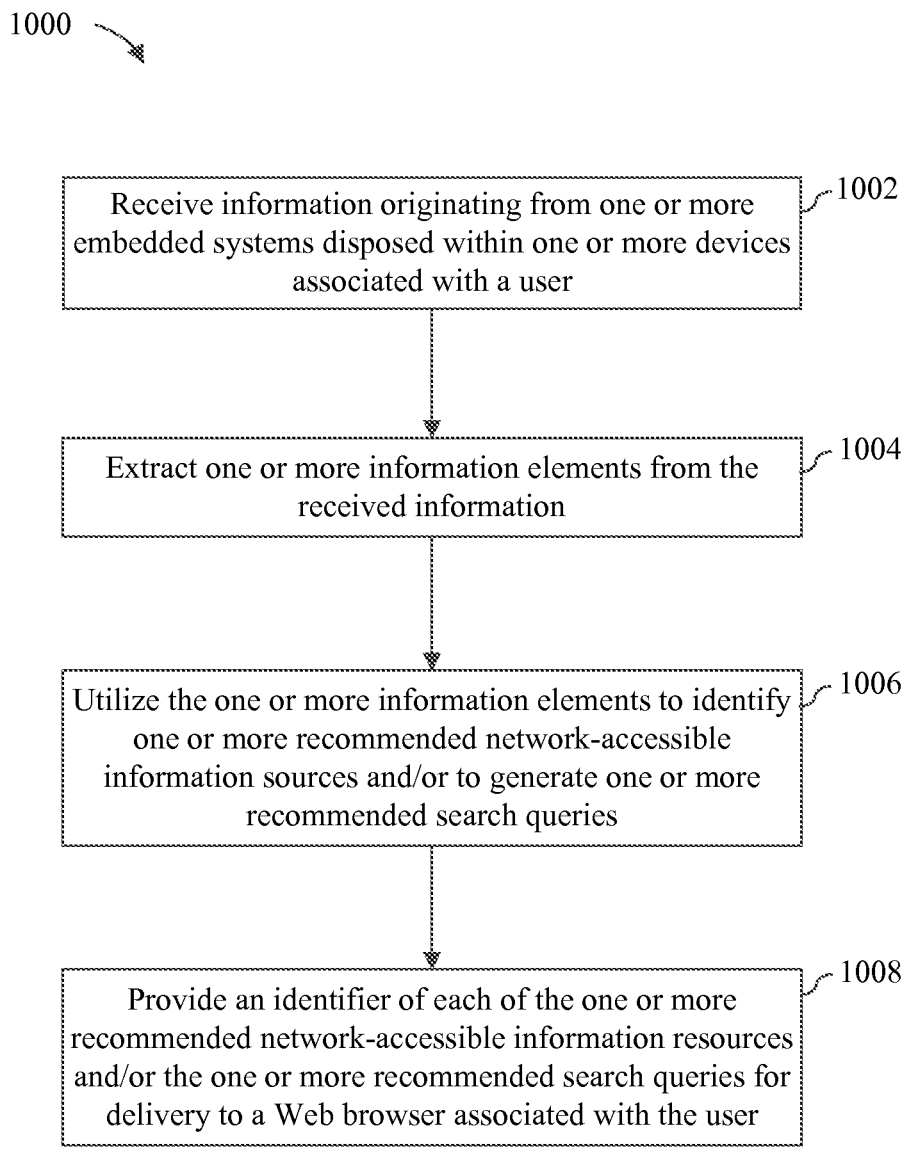
FIG. 10 depicts a flowchart of a method performed by a recommendation engine for providing a web browser with information about one or more recommended network-accessible information resources and/or one or more recommended search queries based on data obtained from a user's IoT devices in accordance with an embodiment.

FIG. 10 depicts a flowchart 1000 of a method performed by a recommendation engine for providing a web browser with a list of recommended network-accessible information resources and/or a list of recommended search queries based on data obtained from the user's IoT devices in accordance with an embodiment. The method of flowchart 1000 may be implemented, for example, by recommendation engine 720 of FIG. 7 or by recommendation engine 900 of FIG. 9. However, the method is not limited to those embodiments.

As shown in FIG. 10, the method of flowchart 1000 begins at step 1002, in which information is received, the information originating from one or more embedded systems disposed within one or more devices associated with a user. In an embodiment, the information is obtained from at least one IoT connected hub that receives the information from the one or more embedded systems via a wired or wireless connection thereto. In an embodiment, step 1002 is performed by IoT data receiver 902 of recommendation engine 900.

At step 1004, one or more information elements are extracted from the information received during step 1002. In an embodiment, this step comprises identifying a device type and/or device model associated with a device from at which at least a portion of the received information originated. Then, a predefined schema associated with the device type and/or device model is applied to at least a portion of the received information to identify at least one of the one or more information elements. In further accordance with such an embodiment, the predefined schema may comprise an XML schema or a JSON schema, although these are only examples. In an embodiment, step 1004 is performed by IoT information element extractor 904 of recommendation engine 900.

At step 1006, the one or more information elements extracted during step 1004 are utilized to identify one or more recommended network-accessible information resources and/or to generate one or more recommended search queries. Each network-accessible information resource may comprise, for example and without limitation, a web site, web page, image, video, or the like. Utilizing the one or more information elements to identify the one or more recommended network-accessible information resources may comprise, for example, utilizing the one or more information elements as search terms in a query that is conducted against an index of network-accessible information resources. Utilizing the one or more information elements to generate the one or more recommended search queries may comprise, for example, utilizing the one or more information elements as components of a recommended search query or as keywords to be used in a search for a recommended search query. In an embodiment, step 1006 is performed by information resource identifier 906 and/or search query generator 908 of recommendation engine 900.

At step 1008, an identifier of each of the one or more recommended network-accessible information resources and/or the one or more recommended search queries are provided for delivery to a web browser associated with the user. This step may comprise, for example, providing the identifier of each of the one or more recommended network-accessible information resources and/or the one or more recommended search queries to an address bar service that dynamically assembles address bar content for delivery to the web browser. Step 1008 may be performed, for example, in response to receipt of a request for address bar content from the web browser. In an embodiment, step 1008 is performed by query response logic 910 of recommendation engine 900.

Figure 11:
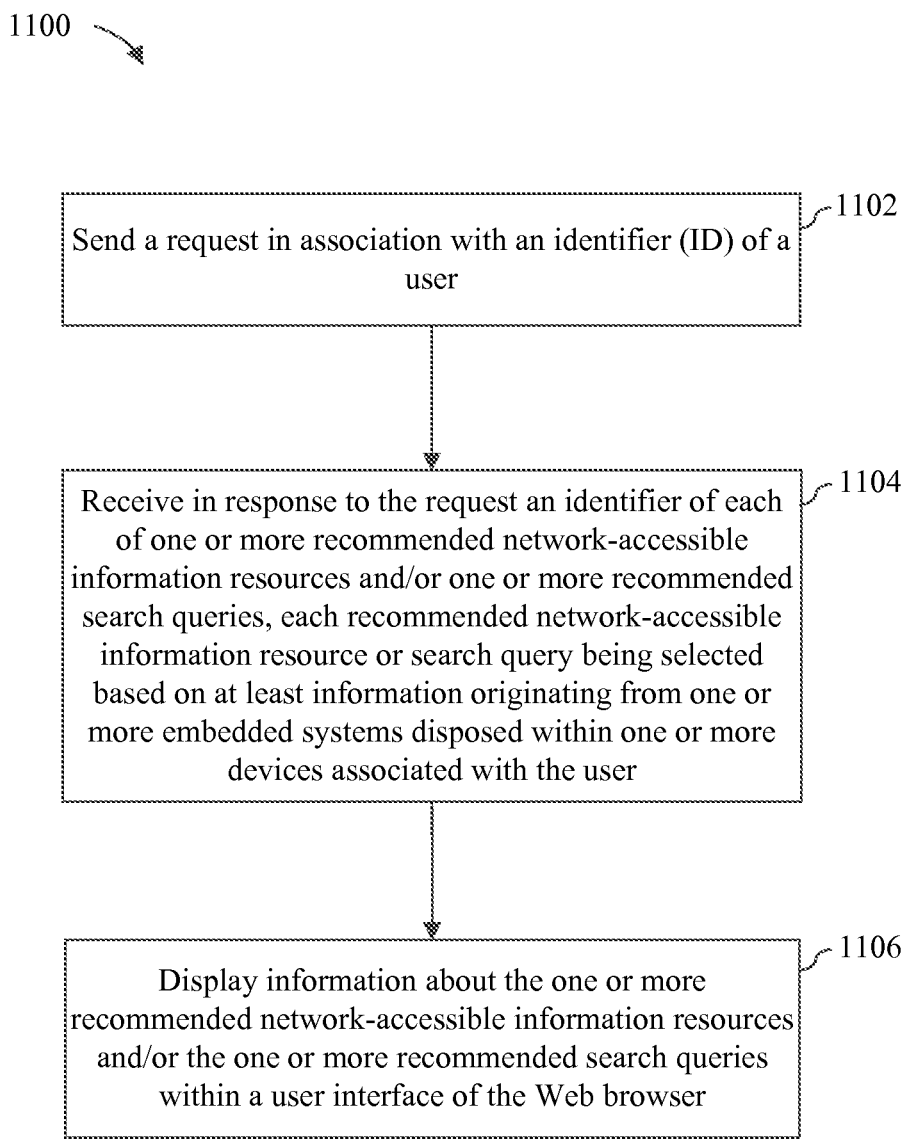
FIG. 11 depicts a flowchart of a method performed by a web browser for providing a user thereof with information about one or more recommended network-accessible information resources and/or one or more recommended search queries based on data obtained from the user's IoT devices in accordance with an embodiment.

FIG. 11 depicts a flowchart 1100 of a method performed by a web browser for providing a user thereof with a list of recommended network-accessible information resources and/or a list of recommended search queries based on data obtained from the user's IoT devices in accordance with an embodiment. The method of flowchart 1100 may be implemented, for example, by web browser 726 of FIG. 7. However, the method is not limited to that embodiment.

As shown in FIG. 11, the method of flowchart 1100 begins at step 1102, in which the web browser sends a request in association with an identifier (ID) of a user. The user ID may comprise, for example, a Microsoft MSA ID as previously described or other ID suitable for identifying a particular user. The request may be sent, for example, to an address bar service such as address bar service 722 of FIG. 7 or address bar service 800 of FIG. 8.

At step 1104, in response to the request, the web browser receives an identifier of each of one or more recommended network-accessible information resources and/or one or more recommended search queries. The one or more recommended network-accessible information resources and/or the one or more recommended search queries are selected based on at least information originating from one or more embedded systems disposed within one or more devices associated with the user. In an embodiment, the information is obtained from at least one IoT connected hub that receives the information from the one or more embedded systems via a wired or wireless connection thereto. The one or more identifiers and/or one or more search queries received during step 1104 may be received, for example, from an address bar service such as address bar service 722 of FIG. 7 or address bar service 800 of FIG. 8.

At step 1106, the web browser displays information about the one or more recommended network-accessible information resources and/or the one or more recommended search queries within a UI of the web browser. For example, the web browser may display information about the one or more recommended network-accessible information resources and/or the one or more recommended search queries within an address bar drop-down menu of a GUI of the web browser.

Figure 12:
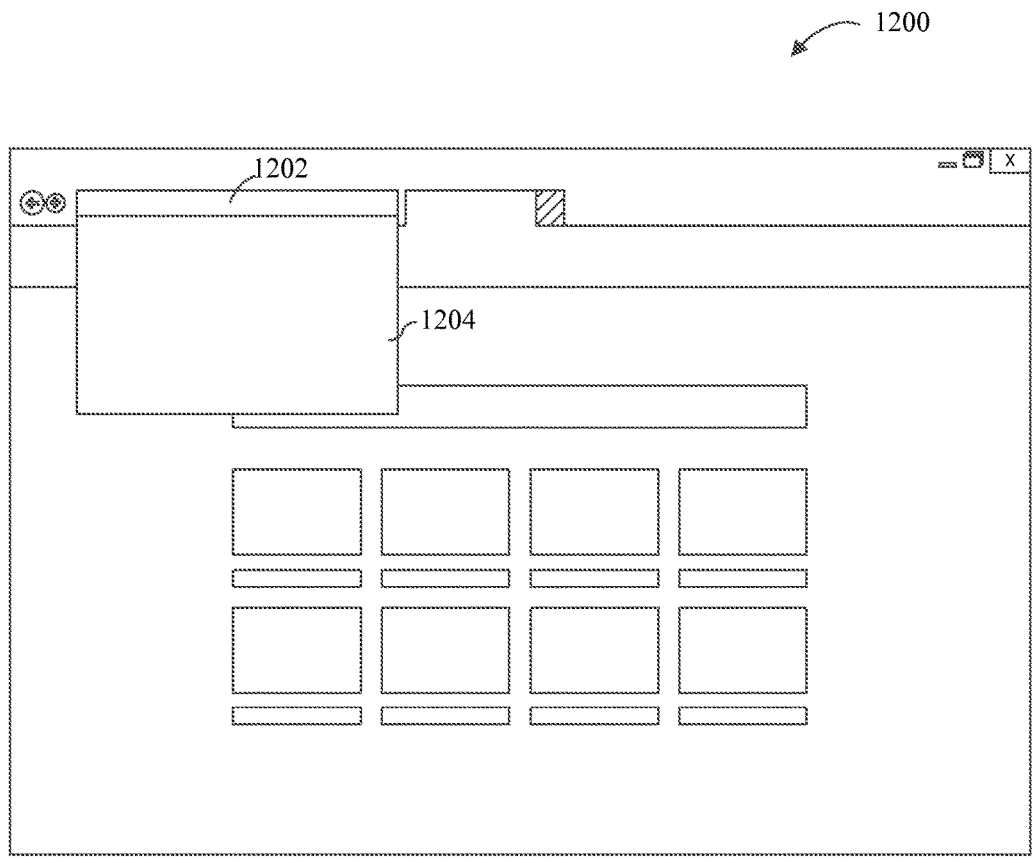
FIG. 12 illustrates an example web browser GUI that displays information resource recommendations and/or search query recommendations to a user within an address bar drop-down menu, the information resource recommendations and/or search query recommendations being based on the user's own IoT device data in accordance with an embodiment.

FIG. 12 illustrates an example web browser GUI 1200 that displays information resource recommendations and/or search query recommendations to a user within an address bar drop-down menu, wherein the information resource recommendations and/or search query recommendations are based on the user's own IoT device data. As shown in FIG. 12, GUI 1200 includes an address bar 1202. When a user interacts with address bar 1202 (e.g., by clicking on it or by beginning to type text into it), the user causes the web browser to send a request for address bar content to an address bar service (such as address bar service 722 of FIG. 7 or address bar service 800 of FIG. 8). The address bar content is then returned by the address bar service to the web browser, which displays the content within GUI 1200.

In particular, the web browser displays the content within an address bar drop-down menu 1204 of GUI 1200. The address bar content may include one or more identifiers of recommended information resources (e.g., URLs) and/or one or more recommended search queries. By clicking on or otherwise interacting with an information resource identifier within address bar drop-down menu 1204, the user causes the web browser to navigate to the corresponding information resource. By clicking on or otherwise interacting with a search query within address bar drop-down menu 1204, the user causes the web browser to invoke a search engine to search for content using the selected search query and to return search results which are then displayed by the web browser.

As was previously described, each information resource identified in address bar drop-down menu 1204 and each search query displayed in address bar drop-down menu 1204 may advantageously be recommended based on IoT device data obtained from one or more devices owned or otherwise associated with a user. Thus, for example, in a scenario in the user's washing machine is malfunctioning and reporting a particular error code, one or more of the information resources identified in address bar drop-down menu 1204 may comprise information resources that deal with repairing the model of washing machine owned by the user when the washing machine is reporting the particular error code. For example, the information resources may comprise the washing machine manufacturer's web site, web pages that discuss how to repair the washing machine, web pages that describe the meaning of the error code, how-to videos about repairing the washing machine, web pages associated with local washing machine repair services, or the like. Furthermore, the search queries displayed in address bar drop-down menu 1204 may be crafted to return useful information about repairing the washing machine when it reports the particular error. For example, a recommended search query may include the name, model or other identifier of the washing machine as well as the error code.

Although in the foregoing examples, information about recommended information resources and/or recommended search queries are presented within a new tab page or in an address bar drop-down menu of a web browser GUI, it is to be understood that the techniques described herein can be used to cause such information to be presented in other portions of a web browser GUI. Furthermore, recommended information resources and/or recommended search queries can be presented to a user via other GUIs (e.g., a GUI of a digital personal assistant) or via non-graphical UIs.

Additional example scenarios that describe how user IoT device data may be used to drive information resource suggestions and search query suggestions will now be described.

A user is driving home in her car and the car's check engine light comes on. An embedded system within the car reports the check engine condition and this data is conveyed via the previously-described infrastructure of FIG. 1 or 7 to a recommendation engine that identifies recommended information resources and/or generates search queries for presentation via a web browser. When the gets home, the user opens her web browser to start searching for information about the check engine light. The web browser calls on a new tab page service or address bar service that is in communication with the recommendation engine. The service(s) cause information about recommended information resources and/or search queries to be displayed within the user's web browser. Thus, for example, the browser may suggest specific web sites or queries that will provide instant answers to assist the user. Examples of information that may be obtained by the user in this manner may include name, address and contact information of a local service center and detailed information about the check engine status, standard causes and suggested remedies (e.g., check the gas tank cap to make sure it is securely fastened). The user can obtain this useful information without having to provide any specifics about their car. For example, in one embodiment, the user need only to start typing "check en . . . " in the address bar (or other data entry interface component) for relevant information resources or search queries to be provided. In an alternate embodiment, links to such information resources or search queries may be provided without the user entering any information.

In another example scenario, a user's dishwasher is malfunctioning and displays an error code on the panel of the device. An embedded system within the dishwasher reports the malfunction and the error code and this data is conveyed via the previously-described infrastructure of FIG. 1 or 7 to a recommendation engine that identifies recommended information resources and/or generates search queries for presentation via a web browser. The user starts his web browser to search for information about the error. When the user starts the web browser, the web browser's new tab page calls on a new tab page service that is in communication with the recommendation engine. The service causes information about recommended information resources to be displayed within the new tab page. The recommended information resources include web sites that specifically relate to the error code on the dishwasher. Thus, with a single click, the user can obtained detailed information about the error code, service center information and suggested remedies.

In yet another example scenario, a user's refrigerator ice maker filter needs to be replaced. An embedded system within the refrigerator reports this condition and the data is conveyed via the previously-described infrastructure of FIG. 1 or 7 to a recommendation engine that identifies recommended information resources and/or generates search queries for presentation via a web browser. The next time the user starts her web browser, the new tab page calls on a new tab page service that is in communication with the recommendation engine. The service causes information about recommended information resources to be displayed within the new tab page. Thus, the new tab page can provide details about the filter status and links to purchase a new filter.

In still another example scenario, a user is wearing a fitness device and returns from a 3-mile run. An embedded system within the fitness device reports data collected during the run and this data is conveyed via the previously-described infrastructure of FIG. 1 or 7 to a recommendation engine that identifies recommended information resources and/or generates search queries for presentation via a web browser. The next time the user starts his web browser, the new tab page calls on a new tab page service that is in communication with the recommendation engine. The service causes information about recommended information resources to be displayed within the new tab page. For example, the recommended information resources may include fitness-related articles, healthy recipes, and information about fitness equipment. As the user continues to work out and improve his health, the suggestions provided by the web browser can be specifically tailored for the user.

In an additional example scenario, an embedded system in a user's clothes dryer reports increasingly longer and longer drying times when drying loads of laundry on behalf of the user. This data is conveyed via the previously-described infrastructure of FIG. 1 or 7 to a recommendation engine that identifies recommended information resources and/or generates search queries for display via a web browser. The next time the user starts her web browser, the new tab page calls on a new tab page service that is in communication with the recommendation engine. The service causes information about recommended information resources to be displayed within the new tab page. For example, the service may cause links to web sites, articles, and videos on how to improve the dryer's performance.

In many of the foregoing examples, data obtained from a single IoT device is used to drive web browser recommendations. However, in certain embodiments, data obtained from multiple embedded systems within disparate device types may also be used to drive a recommendation of a particular information resource or search query. For example, if a user's washing machine is reporting a malfunction and another sensor in the user's home is reporting water on the floor, then the recommendation engine may analyze such IoT device data to infer that the washing machine has sprung a leak and can generate recommendations based on that inference. As another example, if a user's smoke alarm is reporting that smoke has been detected and a user's oven is reporting a malfunction, then the recommendation engine may analyze such IoT device data to infer that the user's oven is generating smoke and can generate recommendations based on that inference. As yet another example, if both a furnace and a stove are reporting that a gas supply is unavailable, then the recommendation engine may analyze such IoT device data to infer that the gas supply to the user's house has been shut off and can generate recommendations based on that inference. As still another example, a user's cooling system may report that air filters associated therewith have not been changed in some time and thermostats in the upstairs rooms of the user's house may be reporting abnormally warm temperatures. The recommendation engine may analyze such IoT device data to infer that the air filters should be changed immediately and can generate recommendations based on that inference.

In still further embodiments, data obtained from multiple embedded systems within instances of the same device type owned by different users may be used to drive a recommendation of a particular information resource or search query. For example, if a large number of washing machines of a particular brand are reporting a similar error code or problem, then recommendations concerning the error code or problem may be directed to a user that owns the washing machine, even if that user's washing machine hasn't yet experienced the error code or problem. Thus, recommendations or suggestions could be made to all users that own a device. In this way, users could be alerted to problems with their devices before they occur. For example, the recommendation engine may cause a certain information resource or search query to be presented to the user in her web browser based on the age of the user's device and based on data generated from other instances of the same device owned by different users.

In additional embodiments, data obtained from one or more embedded systems within one or more respective devices can be used to drive a recommendation of a particular information resource, a search query, or other information to users of a web browser, where the other users don't own any of the respective devices. For example, data obtained from a user device can be used to power a search engine and provide answers even for users that don't own the device. By way of example, items of information such as average indoor temperature in Seattle, the number of hours of television watched by a certain population, how many hours certain homes are unoccupied, can be collected and used to drive the delivery of information to a user within a web browser or search engine. In such scenarios, all of the data would be anonymized to protect user privacy.

III. Generating and/or Ranking Search Results Based on User IoT Device Data

Figure 13:
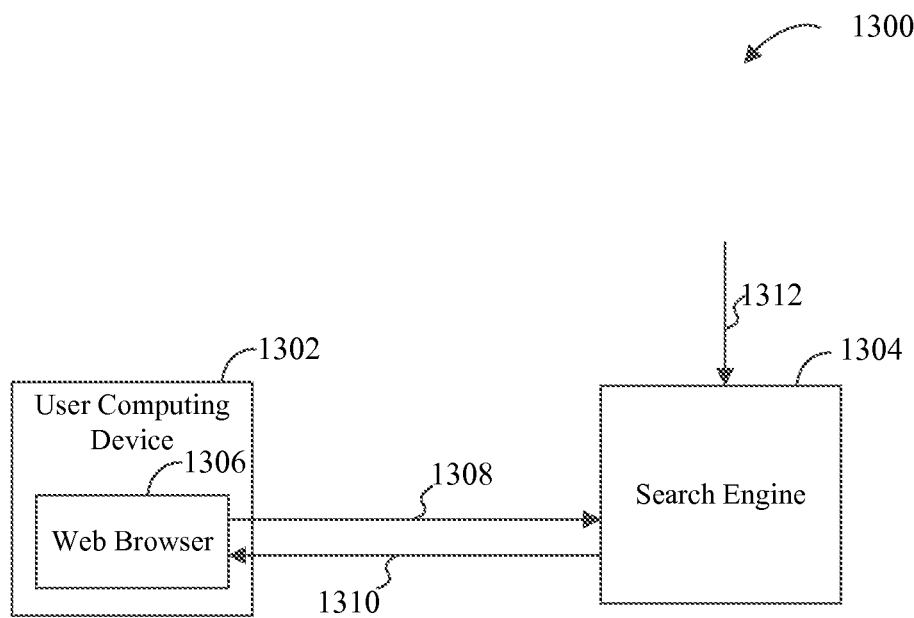
FIG. 13 is a block diagram of a system in which user IoT device data is used by a search engine to generate search results on behalf of a user and/or to rank search results on behalf of a user in accordance with an embodiment.

FIG. 13 is a block diagram of a system 1300 in which user IoT device data is used by a search engine to help produce more relevant search results on behalf of a user and/or to rank search results on behalf of a user. As shown in FIG. 13, system 1300 includes a user computing device 1302 and a search engine 1304 to which user computing device 1302 is communicatively connected.

User computing device 1302 may comprise any device that is capable of executing a web browser. For example and without limitation, user computing device 1302 may comprise a desktop computer, a laptop computer, a tablet computer, a netbook, a smartphone, a gaming console, a smart TV, or the like. Search engine 1304 comprises one or more computer programs executing on one or more processor-based computing devices (e.g., servers). User computing device 1302 is communicatively connected to search engine 1304 via a network, such as but not limited to the Internet.

A user interacts with Web browser 1306 executing on user computing device 1302 to submit a search query 1308 to search engine 1304. In response to receiving search query 1308, search engine 1304 executes a search to find one or more information resources (e.g., web sites, web pages, videos, images or the like) that are relevant to search query 1308. Search engine 1304 returns identifiers of the one or more information resources to Web browser 1306 as part of a search results page 1310.

Search engine 1304 receives IoT device data 1312 associated with the user that submitted the query. This IoT device data 1312 may be received using, for example, an infrastructure similar to that shown in FIG. 1 or FIG. 7 to produce data feeds 134 or 734, respectively. Search engine 1304 may utilize both search query 1308 and IoT device data 1312 to conduct a search for relevant information resources. Search engine 1304 may be able to correlate IoT device data 1312 to the user who submitted query 1308 by matching a user ID associated with IoT device data 1312 to a user ID associated with query 1308.

By utilizing IoT device data 1312 in conjunction with search query 1308, a search algorithm implemented by search engine 1304 may be capable of finding information resources of particular relevance to the user. For example, assume that the user has a broken washing machine and submits a search query 1308 comprising the keywords "broken washing machine." However, further assume that IoT device data 1312 includes data from the user's washing machine that includes a specific error code. Then, in this case, search engine 1304 may return search results 1310 that take into account not only the user's search query but also the error code reported by the washing machine itself. Thus, search results 1310 may include information resources that deal directly with the particular problem that the user's washing machine is experiencing.

As another example, assume again that the user has a broken washing machine and submits a search query comprising the keywords "broken washing machine." Further assume that IoT device data 1312 indicates that the user has a particular brand of washing machine. Still further assume that search engine 1304 receives IoT device data from a large number of other instances of the same washing machine owned by other users that indicate that all of the washing machines suffer from the same defect. Then, in this case, search engine 1304 may return results 1310 that take into account not only the user's search query but also the fact that the user's brand of washing machine is known to suffer from a particular defect. Thus, search results 1310 may include information resources that deal with the particular defect that is common to the user's brand of washing machine.

In addition to using IoT device data 1312 to return more relevant search results, search engine 1304 may also use IoT device data 1312 to rank search results. For example, information resources identified based on the search query "broken washing machine" may be analyzed to determine if they contain or are deemed similar to certain information elements within IoT device data 1312 obtained from the user's washing machine. Those information resources that correlate well to the information elements may be deemed to be more relevant and therefore ranked higher within the search results. Still other methods may be used to rank search results based on IoT device data 1312.

Figure 14:
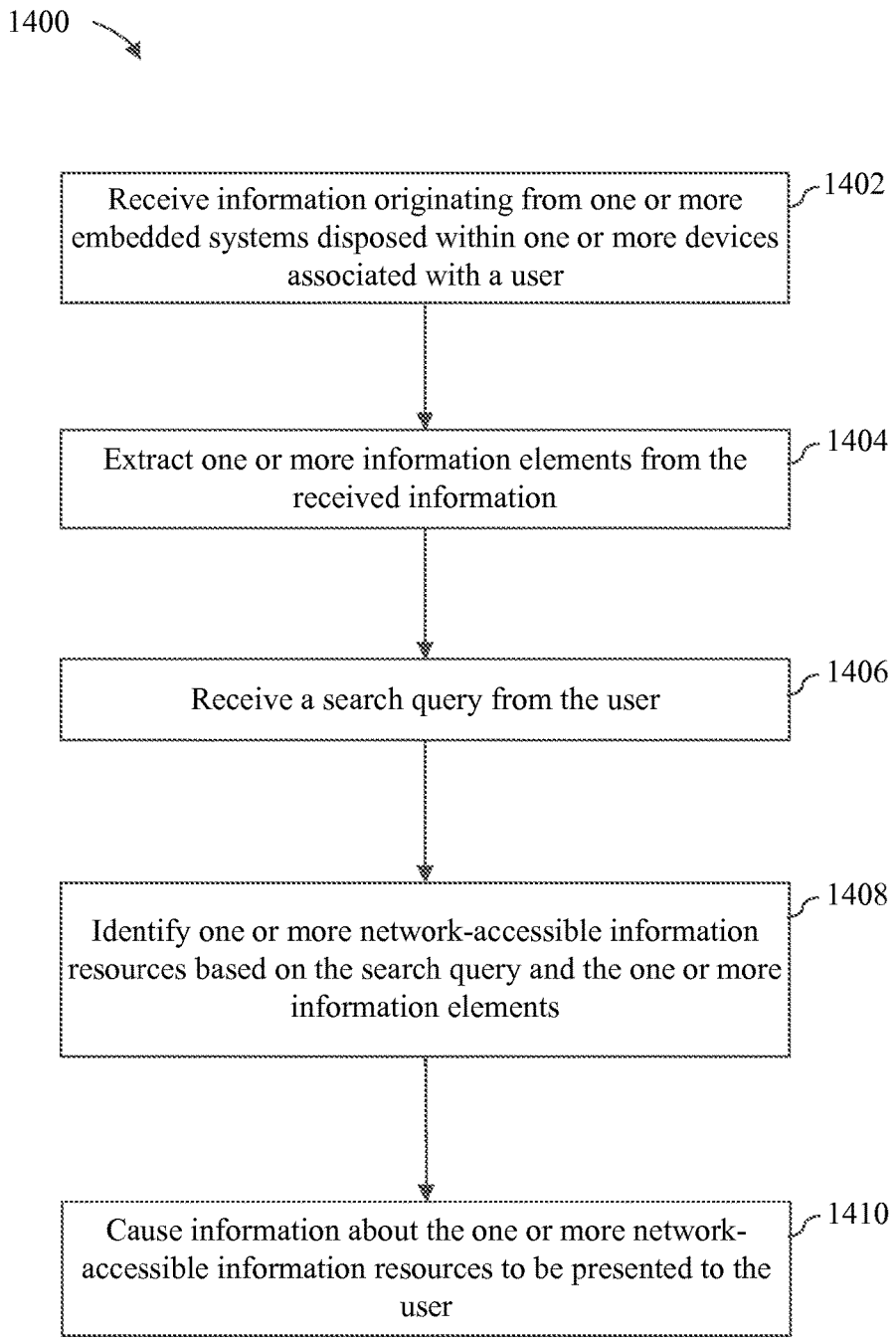
FIG. 14 depicts a flowchart of a method performed by a search engine for generating search results for a user based on data obtained from a user's IoT devices in accordance with an embodiment.

FIG. 14 depicts a flowchart 1400 of a method performed by a search engine for generating search results for a user based on data obtained from a user's IoT devices in accordance with an embodiment. The method of flowchart 1400 may be implemented, for example, by search engine 1304 of FIG. 13. However, the method is not limited to that embodiment.

As shown in FIG. 14, the method of flowchart 1400 begins at step 1402, in which information is received, the information originating from one or more embedded systems disposed within one or more devices associated with a user. In an embodiment, the information is obtained from at least one IoT connected hub that receives the information from the one or more embedded systems via a wired or wireless connection thereto.

At step 1404, one or more information elements are extracted from the information received during step 1402. In an embodiment, this step comprises identifying a device type and/or device model associated with a device from at which at least a portion of the received information originated. Then, a predefined schema associated with the device type and/or device model is applied to at least a portion of the received information to identify at least one of the one or more information elements. In further accordance with such an embodiment, the predefined schema may comprise an XML schema or a JSON schema, although these are only examples.

At step 1406, a search query is received from the user. For example, the search query may be received from the user via a web browser.

At step 1408, one or more network-accessible information resources are identified based on the search query and the one or more information elements extracted during step 1404. Each network-accessible information resource may comprise, for example and without limitation, a web site, web page, image, video, or the like.

At step 1410, information about the one or more network-accessible information resources is caused to be presented to the user. For example, this step may comprise generating a search results page that includes information about the one or more network-accessible resources (which may include a link to each) and then sending the search results page to a web browser for presentation to the user.

The foregoing method of flowchart 1400 may further include ranking the one or more network-accessible information resources based on the one or more information elements extracted during step 1404.

It is noted that the above-described search engine can identify a particular network-accessible information resource based on the search query and information elements originating from multiple embedded systems within disparate device types. Furthermore, the above-described search engine can identify a particular network-accessible information resource based on the search query and information elements originating from multiple embedded systems within instance of the same device type owned by different users.

IV. Example Mobile Device Implementation

Figure 15:
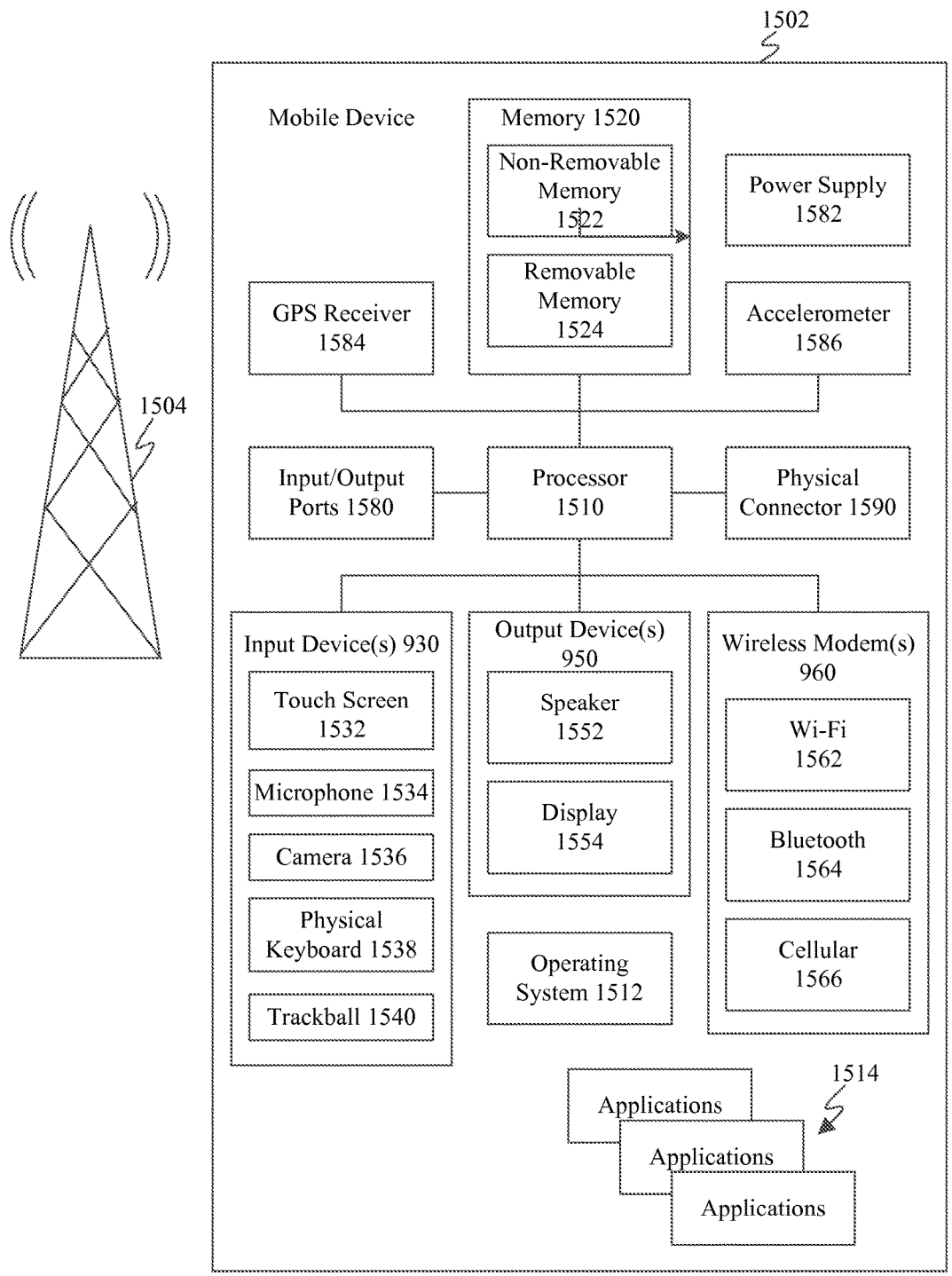
FIG. 15 is a block diagram of an example mobile device that may be used to implement various embodiments.

FIG. 15 is a block diagram of an exemplary mobile device 1502 that may implement embodiments described herein. For example, mobile device 1502 may be used to implement any of user computing device 124 of FIG. 1, user computing device 724 of FIG. 7, or user computing device 1302 of FIG. 13. As shown in FIG. 15, mobile device 1502 includes a variety of optional hardware and software components. Any component in mobile device 1502 can communicate with any other component, although not all connections are shown for ease of illustration. Mobile device 1502 can be any of a variety of computing devices (e.g., cell phone, smartphone, handheld computer, Personal Digital Assistant (PDA), etc.) and can allow wireless two-way communications with one or more mobile communications networks 1504, such as a cellular or satellite network, or with a local area or wide area network.

The illustrated mobile device 1502 can include a controller or processor 1510 (e.g., signal processor, microprocessor, ASIC, or other control and processing logic circuitry) for performing such tasks as signal coding, data processing, input/output processing, power control, and/or other functions. An operating system 1512 can control the allocation and usage of the components of mobile device 1502 and provide support for one or more application programs 1514 (also referred to as "applications" or "apps"). Application programs 1514 may include common mobile computing applications (e.g., e-mail applications, calendars, contact managers, Web browsers, messaging applications) and any other computing applications (e.g., word processing applications, mapping applications, media player applications).

The illustrated mobile device 1502 can include memory 1520. Memory 1520 can include non-removable memory 1522 and/or removable memory 1524. Non-removable memory 1522 can include RAM, ROM, flash memory, a hard disk, or other well-known memory devices or technologies. Removable memory 1524 can include flash memory or a Subscriber Identity Module (SIM) card, which is well known in GSM communication systems, or other well-known memory devices or technologies, such as "smart cards." Memory 1520 can be used for storing data and/or code for running operating system 1512 and applications 1514. Example data can include Web pages, text, images, sound files, video data, or other data to be sent to and/or received from one or more network servers or other devices via one or more wired or wireless networks. Memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1502 can support one or more input devices 1530, such as a touch screen 1532, a microphone 1534, a camera 1536, a physical keyboard 1538 and/or a trackball 1540 and one or more output devices 1550, such as a speaker 1552 and a display 1554. Touch screens, such as touch screen 1532, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1532 and display 1554 can be combined in a single input/output device. The input devices 1530 can include a Natural User Interface (NUI).

Wireless modem(s) 1560 can be coupled to antenna(s) (not shown) and can support two-way communications between the processor 1510 and external devices, as is well understood in the art. The modem(s) 1560 are shown generically and can include a cellular modem 1566 for communicating with the mobile communication network 1504 and/or other radio-based modems (e.g., Bluetooth 1564 and/or Wi-Fi 1562). At least one of the wireless modem(s) 1560 is typically configured for communication with one or more cellular networks, such as a GSM network for data and voice communications within a single cellular network, between cellular networks, or between the mobile device and a public switched telephone network (PSTN).

Mobile device 1502 can further include at least one input/output port 1580, a power supply 1582, a satellite navigation system receiver 1584, such as a Global Positioning System (GPS) receiver, an accelerometer 1586, and/or a physical connector 1590, which can be a USB port, IEEE 1394 (FireWire) port, and/or RS-232 port. The illustrated components of mobile device 1502 are not required or all-inclusive, as any components can be deleted and other components can be added as would be recognized by one skilled in the art.

In an embodiment, mobile device 1502 is configured to perform any of the functions of user computing device 124 of FIG. 1, user computing device 724 of FIG. 7, or user computing device 1302 of FIG. 13. Computer program logic for performing the functions of these devices may be stored in memory 1520 and executed by processor 1510. By executing such computer program logic, processor 1510 may be caused to implement any of the features of any of these devices. Also, by executing such computer program logic, processor 1510 may be caused to perform any or all of the steps of any or all of the flowcharts depicted in FIG. 5 or 11.

V. Example Computer System Implementation

Figure 16:
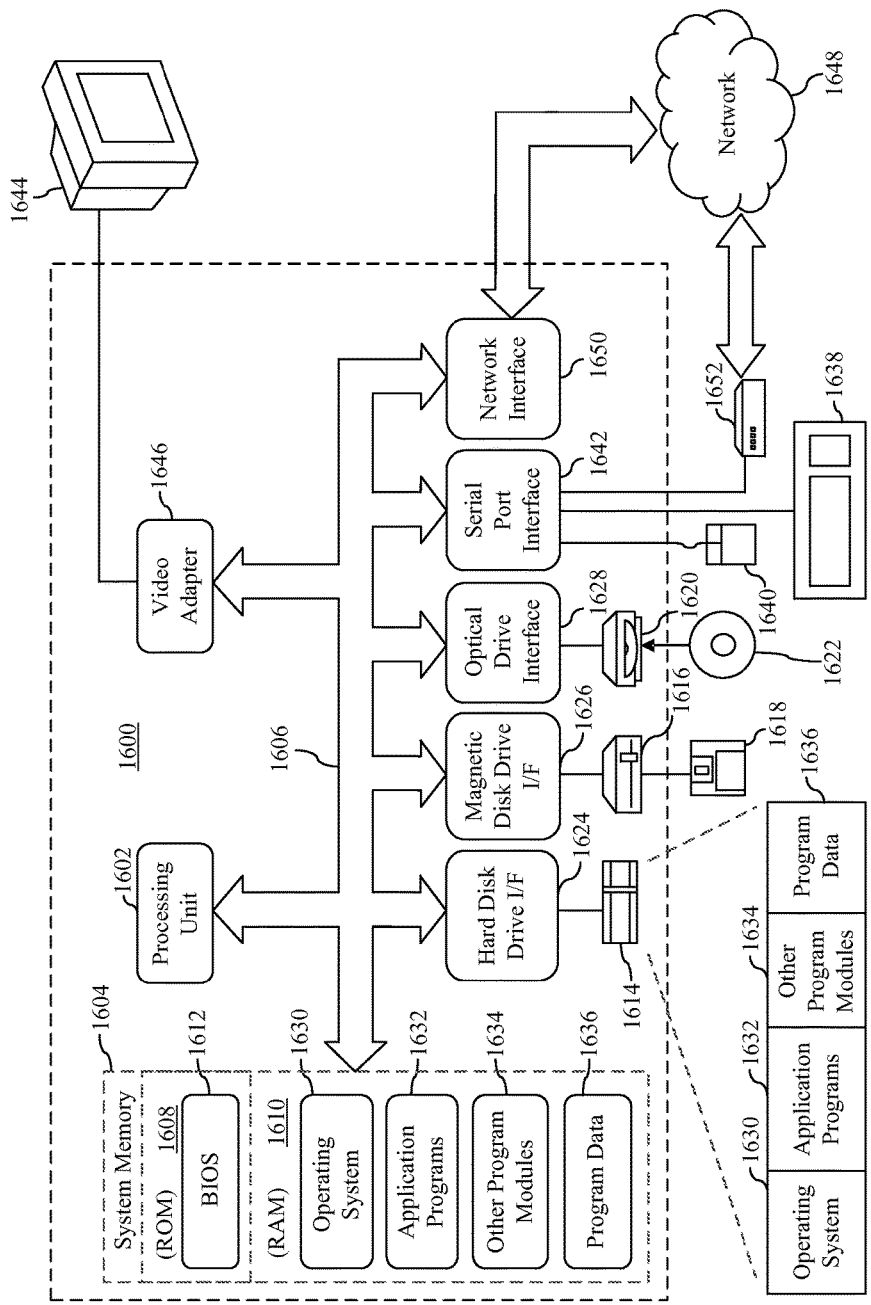
FIG. 16 is a block diagram of an example processor-based computer system that may be used to implement various embodiments.

FIG. 16 depicts an example processor-based computer system 1600 that may be used to implement various embodiments described herein. For example, system 1600 may be used to implement any of ISS 116, search engine services 118, recommendation engine 120, new tab page service 122 or user computing device 124 as described above in reference to FIG. 1, new tab page service 200 as described above in reference to FIG. 2, recommendation engine 300 as described above in reference to FIG. 3, ISS 716, search engine services 718, recommendation engine 720, address bar service 722, or user computing device 724 as described above in reference to FIG. 7, address bar service 800 as described above in reference to FIG. 8, recommendation engine 900 as described above in reference to FIG. 9, or user computing device 1302 or search engine 1304 as described above in reference to FIG. 13. System 1600 may also be used to implement any or all of the steps of any or all of the flowcharts depicted in FIG. 4, 5, 10, 11 or 14. The description of system 1600 provided herein is provided for purposes of illustration, and is not intended to be limiting. Embodiments may be implemented in further types of computer systems, as would be known to persons skilled in the relevant art(s).

As shown in FIG. 16, system 1600 includes a processing unit 1602, a system memory 1604, and a bus 1606 that couples various system components including system memory 1604 to processing unit 1602. Processing unit 1602 may comprise one or more microprocessors or microprocessor cores. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

System 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, BLU-RAY™ disk or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1630, one or more application programs 1632, other program modules 1634, and program data 1636. In accordance with various embodiments, the program modules may include computer program logic that is executable by processing unit 1602 to perform any or all of the functions and features of ISS 116, search engine services 118, recommendation engine 120, new tab page service 122 or user computing device 124 as described above in reference to FIG. 1, new tab page service 200 as described above in reference to FIG. 2, recommendation engine 300 as described above in reference to FIG. 3, ISS 716, search engine services 718, recommendation engine 720, address bar service 722, or user computing device 724 as described above in reference to FIG. 7, address bar service 800 as described above in reference to FIG. 8, recommendation engine 900 as described above in reference to FIG. 9, or user computing device 1302 or search engine 1304 as described above in reference to FIG. 13. The program modules may also include computer program logic that, when executed by processing unit 1602, performs any of the steps or operations shown or described in reference to the flowcharts of FIGS. 4, 5, 10, 11 and 14.

A user may enter commands and information into system 1600 through input devices such as a keyboard 1638 and a pointing device 1640. Other input devices (not shown) may include a microphone, joystick, game controller, scanner, or the like. In one embodiment, a touch screen is provided in conjunction with a display 1644 to allow a user to provide user input via the application of a touch (as by a finger or stylus for example) to one or more points on the touch screen. These and other input devices are often connected to processing unit 1602 through a serial port interface 1642 that is coupled to bus 1606, but may be connected by other interfaces, such as a parallel port, game port, or a universal serial bus (USB). Such interfaces may be wired or wireless interfaces.

A display 1644 is also connected to bus 1606 via an interface, such as a video adapter 1646. In addition to display 1644, system 1600 may include other peripheral output devices (not shown) such as speakers and printers.

System 1600 is connected to a network 1648 (e.g., a local area network or wide area network such as the Internet) through a network interface or adapter 1650, a modem 1652, or other suitable means for establishing communications over the network. Modem 1652, which may be internal or external, is connected to bus 1606 via serial port interface 1642.

As used herein, the terms "computer program medium," "computer-readable medium," and "computer-readable storage medium" are used to generally refer to memory devices or storage structures such as the hard disk associated with hard disk drive 1614, removable magnetic disk 1618, removable optical disk 1622, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650, serial port interface 1642, or any other interface type. Such computer programs, when executed or loaded by an application, enable system 1600 to implement features of embodiments of the present invention discussed herein. Accordingly, such computer programs represent controllers of the system 1600.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1600 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Additional Exemplary Embodiments

A computer-implemented recommendation engine is described herein. The computer-implemented recommendation engine includes one or more processors and one or more memory devices connected to the one or more processors. The one or more memory devices store computer program logic that is executable by the one or more processors to perform operations. The operations include: receiving information originating from one or more embedded systems disposed within one or more devices associated with a user; extracting one or more information elements from the received information; utilizing the one or more information elements to identify one or more recommended network-accessible information resources; and providing an identifier of each of the one or more recommended network-accessible information resources for delivery to a web browser associated with the user, the identifier of each of the one or more recommended network-accessible information resources being useable by the web browser to access the one or more recommended network-accessible information resources on behalf of the user.

In one embodiment of the foregoing computer-implemented recommendation engine, the operations further include: utilizing the one or more information elements to generate one or more recommended search queries and results; and providing the one or more recommended search queries and results for delivery to the web browser.

In another embodiment of the foregoing computer-implemented recommendation engine, the information originating from the one or more embedded systems is obtained from at least one IoT connected hub that receives the information from the one or more embedded systems via a wired or wireless connection thereto.

In still another embodiment of the foregoing computer-implemented recommendation engine, the providing operation comprises providing the identifier of each of the one or more recommended network-accessible information resources to a new tab page service that dynamically constructs new tab page content for delivery to the web browser, the new tab page content including information about each of the one or more recommended network-accessible information resources.

In yet another embodiment of the foregoing computer-implemented recommendation engine, the providing operation comprises providing the identifier of each of the one or more recommended network-accessible information resources for delivery to the web browser for presentation within an address bar drop-down menu.

In a further embodiment of the foregoing computer-implemented recommendation engine, the providing operation is performed in response to receipt of a request from the web browser.

In a still further embodiment of the foregoing computer-implemented recommendation engine, the extracting operation comprises: identifying a device type and/or device model associated with a device from which at least a portion of the received information originated; and applying a predefined schema associated with the device type and/or device model to at least a portion of the received information to identify at least one of the one or more information elements. In further accordance with such an embodiment, the predefined schema comprises one of an extended markup language (XML) schema or a JavaScript Object Notation (JSON) schema.

In another embodiment of the foregoing computer-implemented recommendation engine, utilizing the one or more information elements to identify the one or more recommended network-accessible information resources comprises identifying a single recommended network-accessible information resource based on information elements originating from multiple embedded systems within disparate device types.

In still another embodiment of the foregoing computer-implemented recommendation engine, utilizing the one or more information elements to identify the one or more recommended network-accessible information resources comprises identifying a single network-accessible information resource based on information elements originating from multiple embedded systems within instances of the same device type owned by different users.

A method implemented by a web browser executing on a processor-based computing device is also described herein. The method includes: sending a request in association with an identifier of a user; receiving in response to the request an identifier of each of one or more recommended network-accessible information resources, the one or more recommended network-accessible information resources being selected based on at least information originating from one or more embedded systems disposed within one or more devices associated with the user; and displaying information about the one or more recommended network-accessible information resources within a user interface of the Web browser.

In one embodiment of the foregoing method, the information originating from the one or more embedded systems is obtained from at least one IoT connected hub that receives the information from the one or more embedded systems via a wired or wireless connection thereto.

In another embodiment of the foregoing method, displaying the information about the one or more network-accessible information resources within the user interface of the web browser comprises displaying a new tab page that includes the information about the one or more network-accessible information resources.

In still another embodiment of the foregoing method, displaying the information about the one or more network-accessible information resources within the user interface of the web browser comprises displaying the information about the one or more network-accessible information resources in an address bar drop down menu.

A computer-implemented search engine is also described herein. The computer-implemented search engine includes one or more processors and one or more memory devices connected to the one or more processors. The one or more memory devices store computer program logic that is executable by the one or more processors to perform operations that include: receiving information originating from one or more embedded systems disposed within one or more devices associated with a user; extracting one or more information elements from the received information; receiving a search query from the user; identifying one or more network-accessible information resources based on the search query and the one or more information elements; and causing information about the one or more network-accessible information resources to be presented to the user.

In one embodiment of the foregoing computer-implemented search engine, the information originating from the one or more embedded systems is obtained from at least one IoT connected hub that receives the information from the one or more embedded systems via a wired or wireless connection thereto.

In another embodiment of the foregoing computer-implemented search engine, the extracting operation comprises: identifying a device type and/or device model associated with a device from which at least a portion of the received information originated; and applying a predefined schema associated with the device type and/or device model to at least a portion of the received information to identify at least one of the one or more information elements.

In still another embodiment of the foregoing computer-implemented search engine, the operations further include ranking the one or more network-accessible information resources based on the one or more information elements.

In yet another embodiment of the foregoing computer-implemented search engine, identifying the one or more network-accessible information resources based on the search query and the one or more information elements comprises identifying a single network-accessible information resource based on the search query and information elements originating from multiple embedded systems within disparate device types.

In a further embodiment of the foregoing computer-implemented recommendation engine, identifying the one or more network-accessible information resources based on the search query and the one or more information elements comprises identifying a single network-accessible information resource based on the search query and information elements originating from multiple embedded systems within instances of the same device type owned by different users.

VII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer-implemented recommendation engine, comprising:
one or more processors; and
one or more memory devices connected to the one or more processors, the one or more memory devices storing computer program logic that is executable by the one or more processors to perform operations that include:
receiving information originating from an embedded system disposed within a first device associated with a first user;
extracting one or more information elements from the received information including:
identifying a particular device type and/or device model associated with the first device; and
applying a particular predefined schema associated with the particular device type and/or device model to at least the portion of the received information to identify at least one of the one or more information elements, the particular predefined schema indicating types of information elements included and where the information elements are located within at least the portion of the received information;
determining, based on the one or more information elements, an error code or problem with the first device;
utilizing the one or more information elements and information elements originating from multiple embedded systems within instances of a same device type as the first device but owned by different users to identify one or more recommended network-accessible information resources concerning the error code or problem;
identifying a second user of a second device that is different from the first device but is of the same device type as the first device; and
providing an identifier of each of the one or more recommended network-accessible information resources for delivery to a web browser associated with the second user, the identifier of each of the one or more recommended network-accessible information resources being useable by the web browser to access the one or more recommended network-accessible information resources on behalf of the second user.

2. The computer-implemented recommendation engine of claim 1, wherein the operations further include:
utilizing the one or more information elements and the information elements originating from multiple embedded systems to generate one or more recommended search queries and results; and
providing the one or more recommended search queries and results for delivery to the web browser.

3. The computer-implemented recommendation engine of claim 1, wherein the information originating from the embedded system is obtained from at least one Internet of Things (IoT) connected hub that receives the information from the embedded system via a wired or wireless connection thereto.

4. The computer-implemented recommendation engine of claim 1, wherein the providing operation comprises:
providing the identifier of each of the one or more recommended network-accessible information resources to a new tab page service that dynamically constructs new tab page content for delivery to the web browser, the new tab page content including information about each of the one or more recommended network-accessible information resources.

5. The computer-implemented recommendation engine of claim 1, wherein the providing operation comprises:
providing the identifier of each of the one or more recommended network-accessible information resources for delivery to the web browser for presentation within an address bar drop-down menu.

6. The computer-implemented recommendation engine of claim 1, wherein the providing operation is performed in response to receipt of a request from the web browser.

7. The computer-implemented recommendation engine of claim 1, wherein the particular predefined schema comprises one of an extended markup language (XML) schema or a JavaScript Object Notation (JSON) schema.

8. The computer-implemented recommendation engine of claim 1, wherein utilizing the one or more information elements to identify the one or more recommended network-accessible information resources comprises:
   identifying a single recommended network-accessible information resource based on information elements originating from multiple embedded systems within disparate device types.

9. A method implemented by a web browser executing on a processor-based computing device, the method comprising:
   sending a request in association with an identifier of a first user of a first device;
   receiving in response to the request an identifier of each of one or more recommended network-accessible information resources, the one or more recommended network-accessible information resources being selected based on at least on one or more information elements originating from multiple embedded systems disposed within instances of a same device type as the first device but owned by different users, the one or more information elements being associated with an error code or problem with each instance of the same device type and being extracted from information received from the respective embedded system by identifying a particular device type and/or device model associated with the respective instance of the same device type and by applying a particular predefined schema associated with the particular device type and/or device model to at least the portion of the received information to identify at least one of the one or more information elements, the particular predefined schema indicating types of information elements included and where the information elements are located within at least the portion of the received information; and
   displaying information about the one or more recommended network-accessible information resources within a user interface of the web browser.

10. The method of claim 9, wherein the information originating from the embedded system is obtained from at least one Internet of Things (IoT) connected hub that receives the information from the embedded system via a wired or wireless connection thereto.

11. The method of claim 9, wherein displaying the information about the one or more network-accessible information resources within the user interface of the web browser comprises:
   displaying a new tab page that includes the information about the one or more network-accessible information resources.

12. The method of claim 9, wherein displaying the information about the one or more network-accessible information resources within the user interface of the web browser comprises:
   displaying the information about the one or more network-accessible information resources in an address bar drop down menu.

13. A computer-implemented search engine, comprising:
   one or more processors; and
   one or more memory devices connected to the one or more processors, the one or more memory devices storing computer program logic that is executable by the one or more processors to perform operations that include:
      receiving information originating from an embedded system disposed within a first device associated with a first user;
      extracting one or more information elements from the received information including:
         identifying a particular device type and/or device model associated with the first device; and
         applying a particular predefined schema associated with the particular device type and/or device model to at least the portion of the received information to identify at least one of the one or more information elements, the particular predefined schema indicating types of information elements included and where the information elements are located within at least the portion of the received information;
      determining, based on the one or more information elements, an error code or problem with the first device;
      identifying a second user of a second device that is different from the first device but is of a same device type as the first device;
      receiving a search query from the second user;
      identifying one or more network-accessible information resources concerning the error code or problem based on the search query, the one or more information elements, and information elements originating from multiple embedded systems within instances of the same device type as the first device but owned by different users; and
      causing information about the one or more network-accessible information resources to be presented to the second user.

14. The computer-implemented search engine of claim 13, wherein the information originating from the embedded system is obtained from at least one Internet of Things (IoT) connected hub that receives the information from the embedded system via a wired or wireless connection thereto.

15. The computer-implemented search engine of claim 13, wherein the operations further include:
   ranking the one or more network-accessible information resources based on the one or more information elements.

16. The computer-implemented search engine of claim 13, wherein identifying the one or more network-accessible information resources based on the search query and the one or more information elements comprises:
   identifying a single network-accessible information resource based on the search query and information elements originating from multiple embedded systems within disparate device types.

17. The computer-implemented recommendation engine of claim 1, wherein the operations further include:
   storing the one or more information elements in association with a user ID of the user.

18. The computer-implemented recommendation engine of claim 1, wherein the one or more information elements include at least one of a device ID, a device type, a device model, device state information, and device error codes.

* * * * *